United States Patent
Gillam

(10) Patent No.: US 10,157,485 B2
(45) Date of Patent: Dec. 18, 2018

(54) METHOD AND SYSTEM FOR MERGING OF POLYGONS IN ADJACENT TILES

(71) Applicant: Texas Instruments Incorporated, Dallas, TX (US)

(72) Inventor: Christopher John Gillam, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/343,207

(22) Filed: Nov. 4, 2016

(65) Prior Publication Data

US 2017/0236315 A1    Aug. 17, 2017

Related U.S. Application Data

(60) Provisional application No. 62/296,206, filed on Feb. 17, 2016.

(51) Int. Cl.
*G06T 11/40*    (2006.01)

(52) U.S. Cl.
CPC .......... *G06T 11/40* (2013.01); *G06T 2210/21* (2013.01)

(58) Field of Classification Search
CPC .............................. G06T 11/60; G06K 9/6201
USPC .......................................................... 345/441
See application file for complete search history.

(56) References Cited

U.S. PATENT DOCUMENTS

| | | | | |
|---|---|---|---|---|
| 7,755,629 | B2 * | 7/2010 | Smith | G06T 11/60 345/441 |
| 2002/0050988 | A1 * | 5/2002 | Petrov | G06K 9/20 345/418 |
| 2005/0206653 | A1 * | 9/2005 | Beaumont | G06T 11/40 345/629 |
| 2006/0227133 | A1 * | 10/2006 | Petrov | G06K 9/20 345/419 |

OTHER PUBLICATIONS

K. G. Suffern, "Quadtree Algorithms for Contouring Functions of Two Variables", The Computer Journal, vol. 33, No. 5, 1990, revised Apr. 1989, pp. 402-407.

Kevin G. Suffern and Edward D. Fackerell, "Interval Methods in Computer Graphics", Computer & Graphics, vol. 15, No. 3, pp. 331-340, 1991.

* cited by examiner

*Primary Examiner* — Ryan R Yang
(74) *Attorney, Agent, or Firm* — Rose Alyssa Keagy; Charles A. Brill; Frank D. Cimino

(57) ABSTRACT

A method for merging polygons in adjacent tiles is provided that includes determining that a first polygon in a tile having a first edge linked list and a second polygon in an adjacent tile having a second edge linked list have overlapping invalid edges, wherein an edge includes an ordered set of point coordinates in which an initial two point coordinates lie on a tile boundary and last point coordinates of the set also lie on a tile boundary, and an edge linked list is an ordered list of edges of a polygon, and merging the first edge linked list and the second edge linked list to generate a third edge linked list for a merged polygon comprising the first polygon and the second polygon.

22 Claims, 35 Drawing Sheets

METHOD AND SYSTEM FOR MERGING OF POLYGONS IN ADJACENT TILES

CROSS-REFERENCE TO RELATED APPLICATIONS

This application claims benefit of U.S. Provisional Patent Application No. 62/296,206 filed Feb. 17, 2016, which is incorporated herein by reference in its entirety.

BACKGROUND OF THE INVENTION

Field of the Invention

Embodiments of the present invention generally relate to plotting of implicit relations and more specifically relate to merging of polygons in adjacent tiles in plotting implicit inequalities.

Description of the Related Art

Plotting of implicit relations is a desirable feature in mathematical software packages. Given a function of two variables f(x,y), an implicit relation is denoted by $f(x,y)$ op 0, op $\in \{=, <, \leq, >, \geq\}$. If op $\in \{<, \leq, >, \geq\}$, then $f(x,y)$ op 0 is considered an implicit inequality; otherwise $f(x,y)=0$ is considered an implicit equation. Plotting implicit relations on a two-dimensional Cartesian coordinate system differs from other plotting methods, since the plotting does not require the dependent variable, usually y, to be given explicitly in terms of the independent variable, usually x. Graphics algorithms for plotting implicit equations typically include two stages: detecting the contour of the function and rendering (plotting) the detected contour. When plotting implicit inequalities, the two stages are equivalent: detecting the region which satisfies the inequality and rendering the detected region. The boundary of the plotted region is often the contours of the function.

One well known approach to detecting the contour of a function of two variables recursively creates a rectangular mesh on top of the domain of the function. The recursion ends when a limit is reached in those parts of the graphing region on top of the domain of the function. The limit may be, for example, the size of a side of the smallest grid or the number of times to recur.

The recursive process begins with a rectangle of the size of the graphing region, i.e., the size of the display area for the plot, and recursively divides this rectangle into smaller and smaller rectangles until the limit is reached or some method, such as interval arithmetic, determines that no contour exists in the current rectangle. At the smallest rectangle, the function is evaluated at the corner of the smallest rectangle to determine whether or not a contour crosses a boundary of the rectangle. If the evaluation of the function at the corners suggests that the contour crosses the boundary of the curve, then the smallest rectangles (tiles) in the rectangular mesh may contain segments of the contour. Examples of this approach to detecting the contour of a function of two variables are described, for example, in K. G. Suffern, "Quadtree Algorithms for Contouring Functions of Two Variables," The Computer Journal, Vol. 33, No. 5, pp. 402-407, 1990 ("Suffern" herein).

The approach of Suffern may be extended to implicit inequalities. Recursion is handled in the same way until the limit is reached or some method determines the contour of the function does not exist in the rectangle. If the recursion stops early, then the corners are evaluated to determine if the entire rectangle satisfies the inequality. If the recursion hits the limit, then, the smallest rectangles may contain segments of regions which satisfy the inequality.

The plotting stage involves creating graphical representations of the contour segments and/or regions. For an implicit equation, one approach is to draw lines in the smallest rectangle to represent the contour. For an implicit inequality, a polygon would be drawn with either at least one boundary lying on the edge of the rectangle or with the line estimate of the contour. If further analysis is needed on the graphical representations, such as tracing the contours, then connecting the lines or merging the polygons in adjacent rectangles (tiles) is needed. The merging/connecting is performed while backing out of the recursion. Depending on the function, the size of the graphing region, and the minimum rectangle size, there may be hundreds or thousands of polygons to be merged to plot the relation. Thus, the computational complexity of the merging process and the memory required for storing the polygons during the memory process may be important considerations, especially for devices with limited memory capacity and processing throughput.

SUMMARY

Embodiments of the present invention relate to methods and systems for merging polygons in adjacent tiles. In one aspect, a method for merging polygons in adjacent tiles is provided that includes determining that a first polygon in a tile having a first edge linked list and a second polygon in an adjacent tile having a second edge linked list have overlapping invalid edges, wherein an edge includes an ordered set of point coordinates in which an initial two point coordinates lie on a tile boundary and last point coordinates of the set also lie on a tile boundary, and an edge linked list is an ordered list of edges of a polygon, and merging the first edge linked list and the second edge linked list to generate a third edge linked list for a merged polygon comprising the first polygon and the second polygon.

In one aspect, a digital device is provided that includes a memory storing software instructions for merging polygons in adjacent tiles, wherein the software instructions comprise software instructions to determine that a first polygon in a tile having a first edge linked list and a second polygon in an adjacent tile having a second edge linked list have overlapping invalid edges, wherein an edge includes an ordered set of point coordinates in which an initial two point coordinates lie on a tile boundary and last point coordinates of the set also lie on a tile boundary, and an edge linked list is an ordered list of edges of a polygon, and merge the first edge linked list and the second edge linked list to generate a third edge linked list for a merged polygon comprising the first polygon and the second polygon, and a processor coupled to the memory to execute the software instructions.

In one aspect, a computer readable medium storing software instructions is provided in which the software instructions, when executed by a processor, cause a method for merging polygons in adjacent tiles to be executed. The method includes determining that a first polygon in a tile having a first edge linked list and a second polygon in an adjacent tile having a second edge linked list have overlapping invalid edges, wherein an edge includes an ordered set of point coordinates in which an initial two point coordinates lie on a tile boundary and last point coordinates of the set also lie on a tile boundary, and an edge linked list is an ordered list of edges of a polygon, and merging the first edge linked list and the second edge linked list to generate a third edge linked list for a merged polygon comprising the first polygon and the second polygon.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
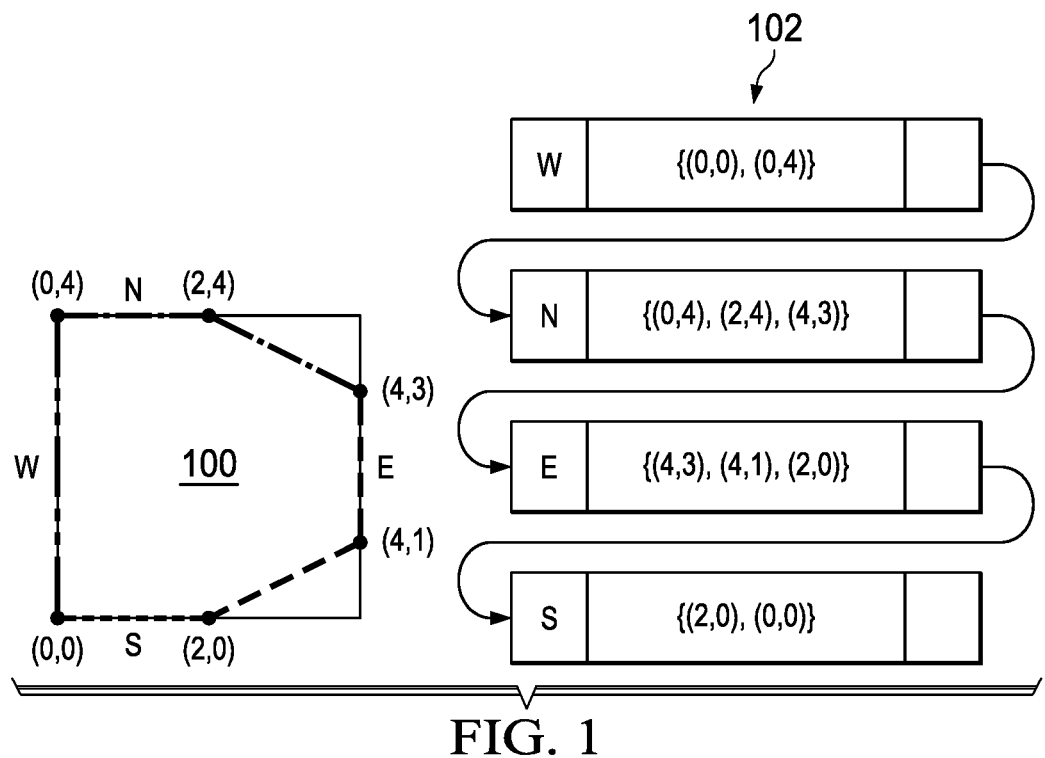
FIG. 1 is a simple example illustrating a polygon with edges on all four boundaries of a tile.

Specific embodiments of the invention will now be described in detail with reference to the accompanying figures. Like elements in the various figures are denoted by like reference numerals for consistency.

Embodiments of the disclosure provide for merging of polygons in adjacent tiles. More specifically, given a two dimensional grid of tiles with polygons lying in adjacent tiles, embodiments provide for merging of polygons in adjacent tiles having overlapping edges at a tile boundary. A tile may include multiple polygons and a polygon may have multiple edges at a tile boundary.

A polygon is represented in memory as an edge linked list of edges. An edge of a polygon is a set of point coordinates such that the coordinates of the initial two points of the edge lie on a tile boundary and are the only consecutive points on the same tile boundary and the coordinates of the last point of the edge is also on a tile boundary. Each edge also has a edge type based on the location of the first two points in the edge, i.e., the edge type indicates whether an edge is on a north, south, east, or west boundary of a tile. Thus, an edge in a polygon list contains an edge type, the number of points in the edge, and a clockwise ordered list of the coordinates of the points in the edge. If a polygon does not have two consecutive points on any tile boundary, the edge linked list of the polygon contains a single edge with a type indicating the polygon has no edges.

The edges in the edge linked list representing a polygon are linked in clockwise order. For convenience of description herein, the order in many of the examples herein is assumed to begin with the west edge, such that the edge order is west, north, east, south if all four edges are present. One of ordinary skill in the art will understand embodiments in which the edge ordering begins with a different edge. In the examples herein, the edge types are assumed to be W, N, E, S and Null. One of ordinary skill in the art will understand other suitable representations of the edge types.

FIG. 1 is a simple example illustrating a polygon 100 with edges on all four boundaries of a tile. The west edge of the polygon includes two points, (0, 0) and (0, 4). The north edge of the polygon 100 includes three points, (0, 4), (2, 4), and (4, 3). Note that the coordinates of the initial two points are on the north boundary of the tile and the point coordinates of the final point is on the east boundary of the tile, thus meeting the above edge criteria. The east edge of the polygon 100 also includes three points, (4, 3), (4, 1), and (2, 0). The south edge includes two points, (2, 0) and (0, 0). The edge linked list 102 illustrates the data structure for the polygon 100.

Figure 2:
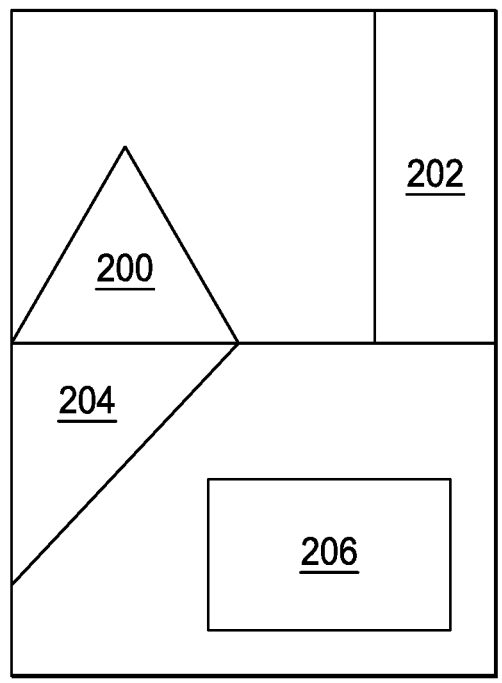
FIG. 2 is a simple example illustrating multiple polygons in adjacent tiles.

FIG. 2 is a simple example illustrating multiple polygons in adjacent tiles. Note that polygon 200 has a single edge, the south edge and polygon 204 has two edges, a north edge and a west edge. Also note that the single edge of polygon 200 and the north edge of polygon 204 overlap, making these two polygons mergeable. Note that polygon 202 has a north edge, an east edge and a south edge, but there is no overlapping polygon in the south tile. Finally, note that polygon 206 has no edges.

Figure 3:
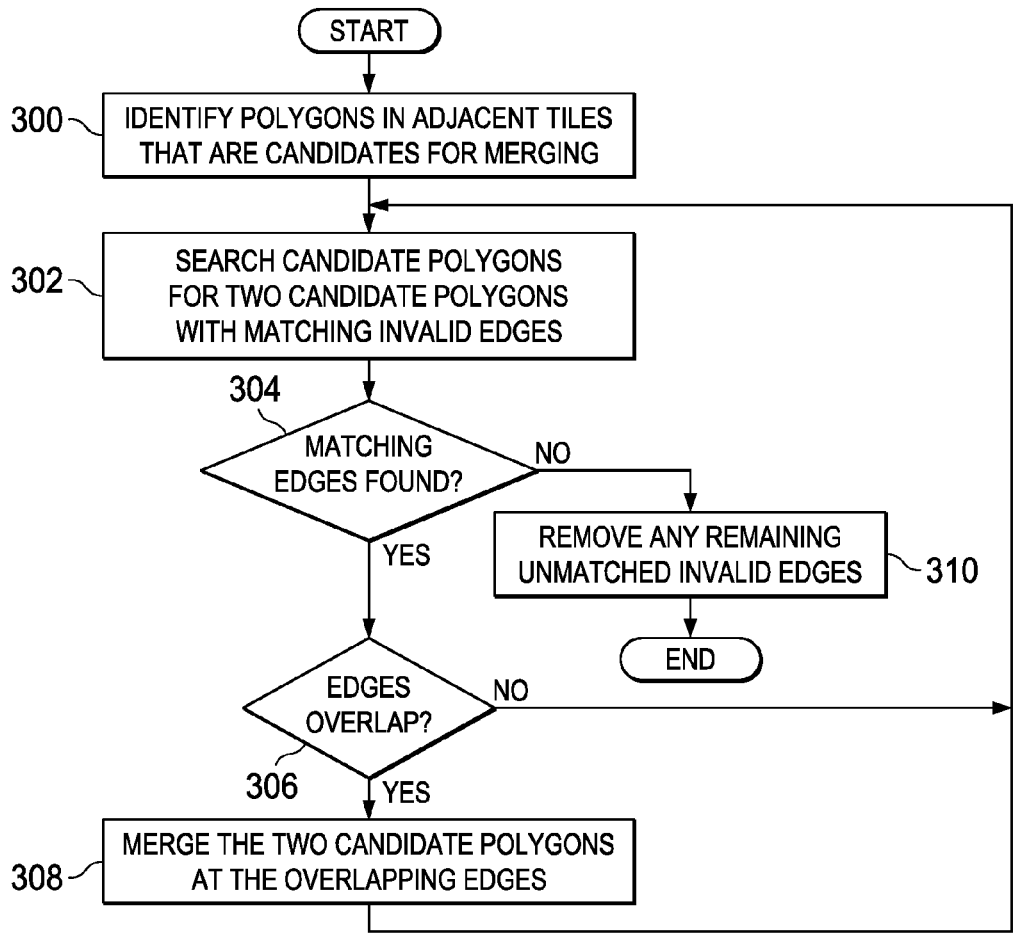
FIGS. 3-5 are flow diagrams of a method for merging polygon in adjacent tiles.
Figure 4:
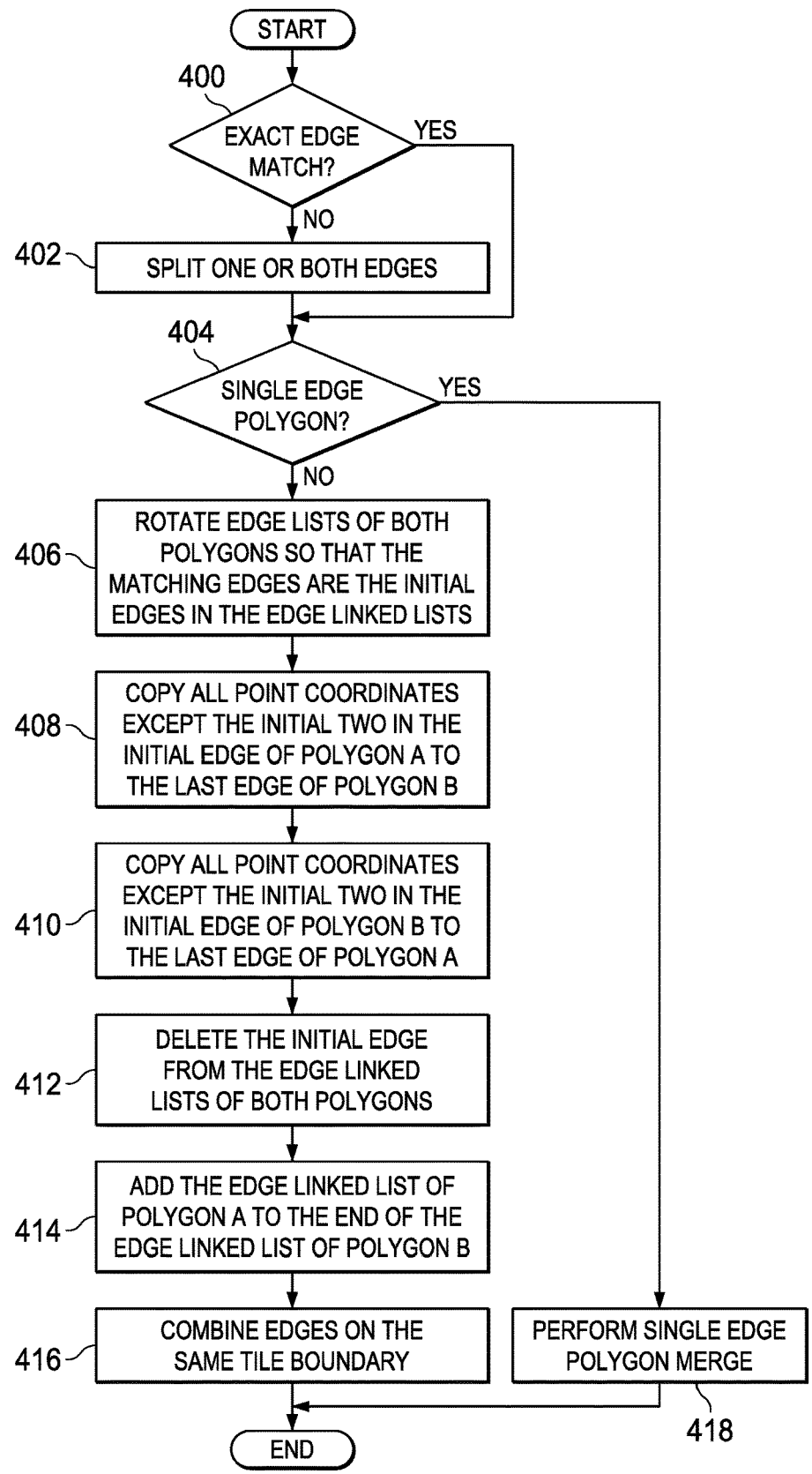
Figure 5:
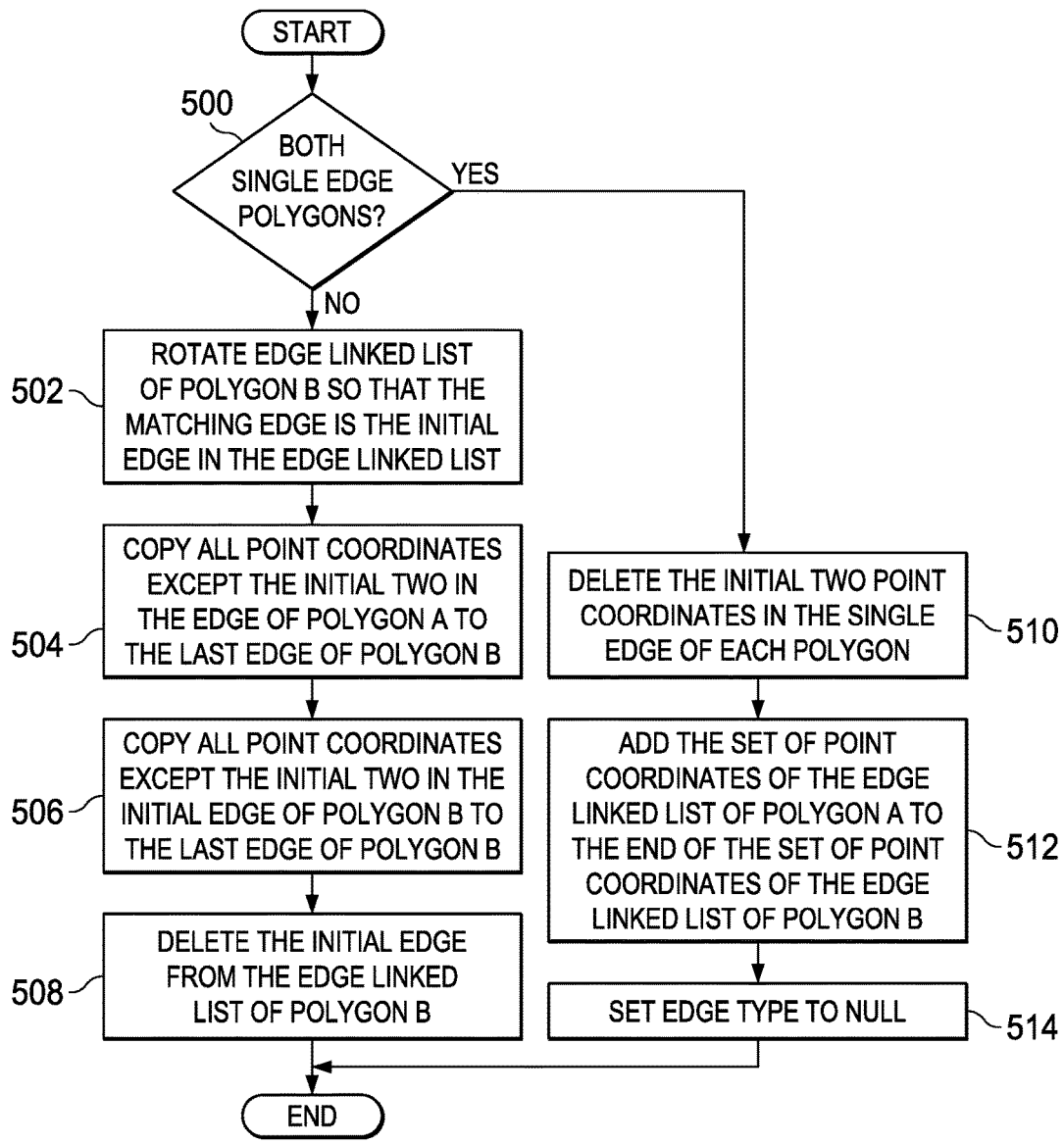

FIGS. 3-5 are flow diagrams of a method for merging polygons in adjacent tiles given the above representation of a polygon. The method operates on pairs of adjacent tiles, i.e., tiles with shared north south boundaries and tiles with shared east west boundaries. The method is explained in reference to the simple examples of FIGS. 6-12, FIGS. 13-15, FIGS. 16-20, FIGS. 21-29, and the example of FIG. 2. The examples all assume that the two adjacent tiles have shared north south boundaries. One of ordinary skill in the art will understand embodiments in which the tiles have shared east west boundaries.

Figure 6:
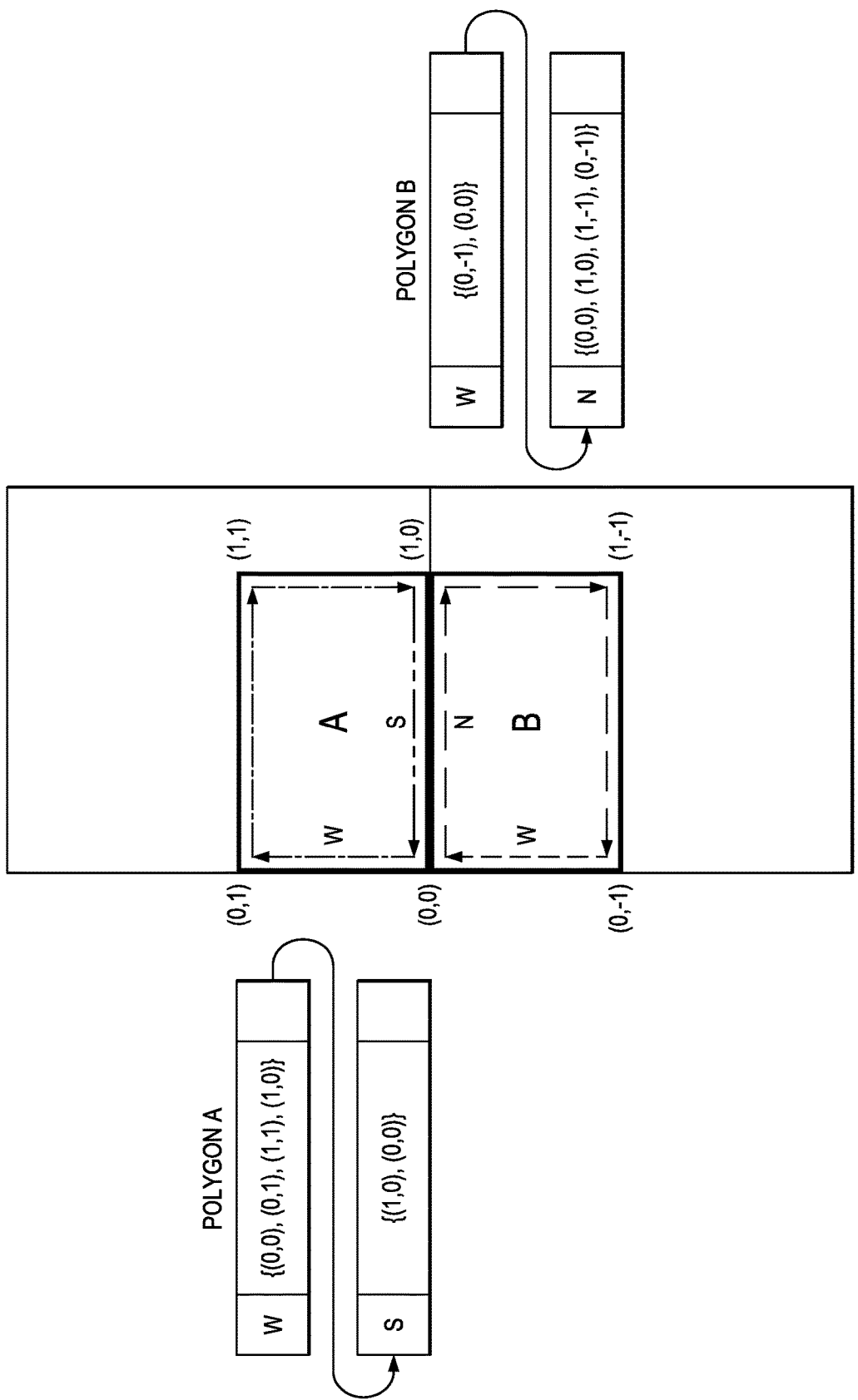
FIGS. 6-12, FIGS. 13-15, FIGS. 16-20, FIGS. 21-29, FIGS. 30-32, and FIG. 33-35 are examples illustrating merging of adjacent tiles.
Figure 11:
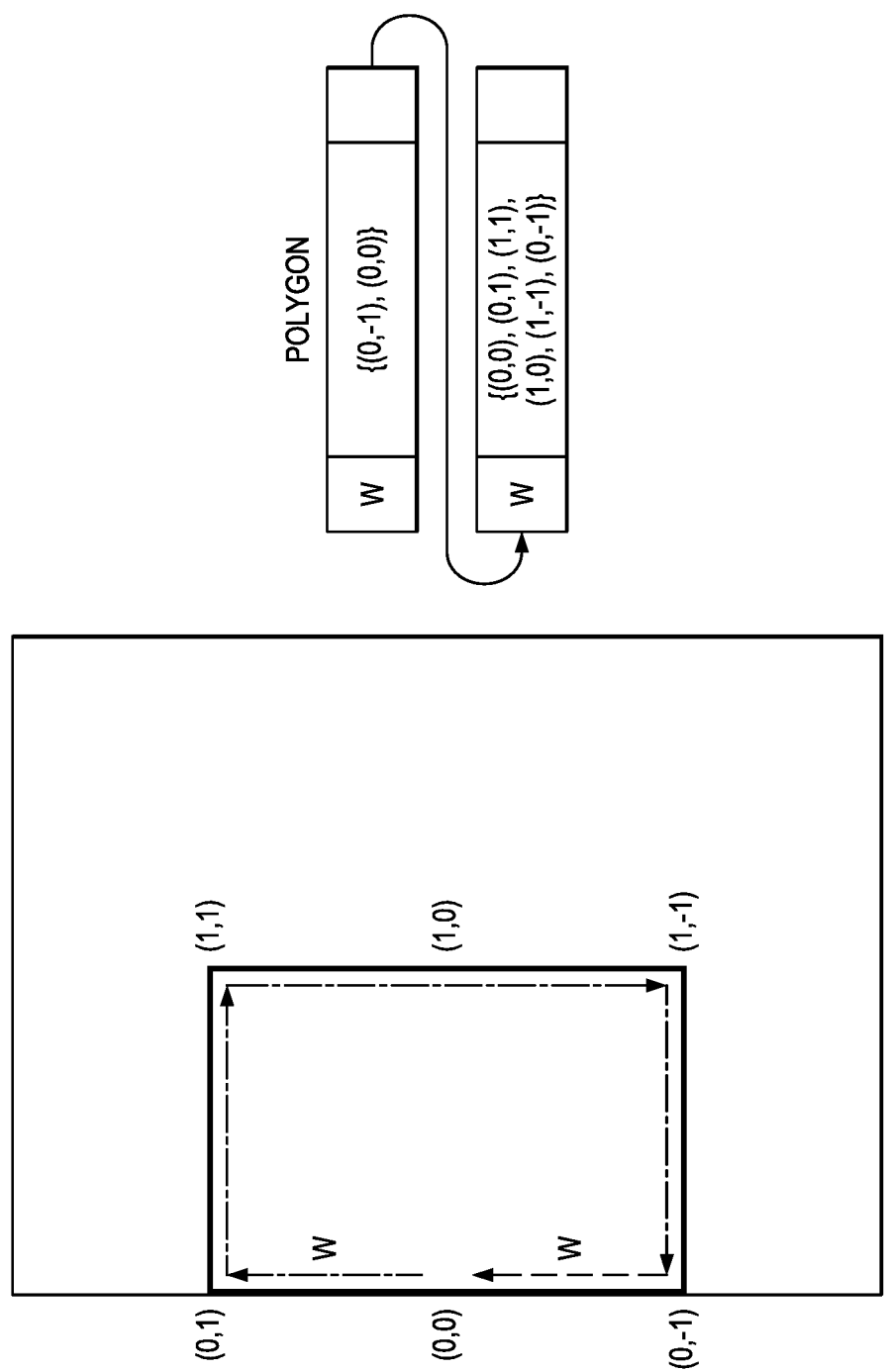
Figure 12:
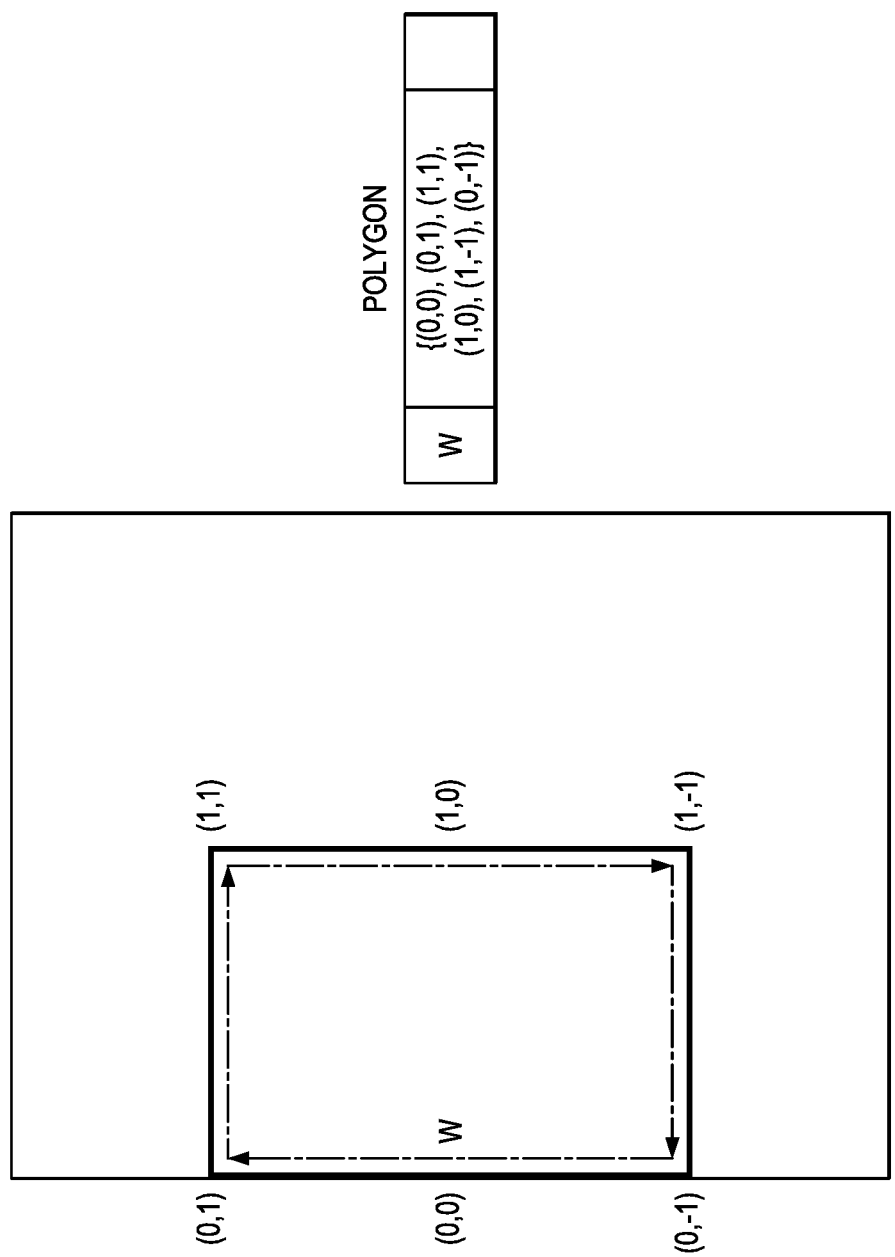
Figure 13:
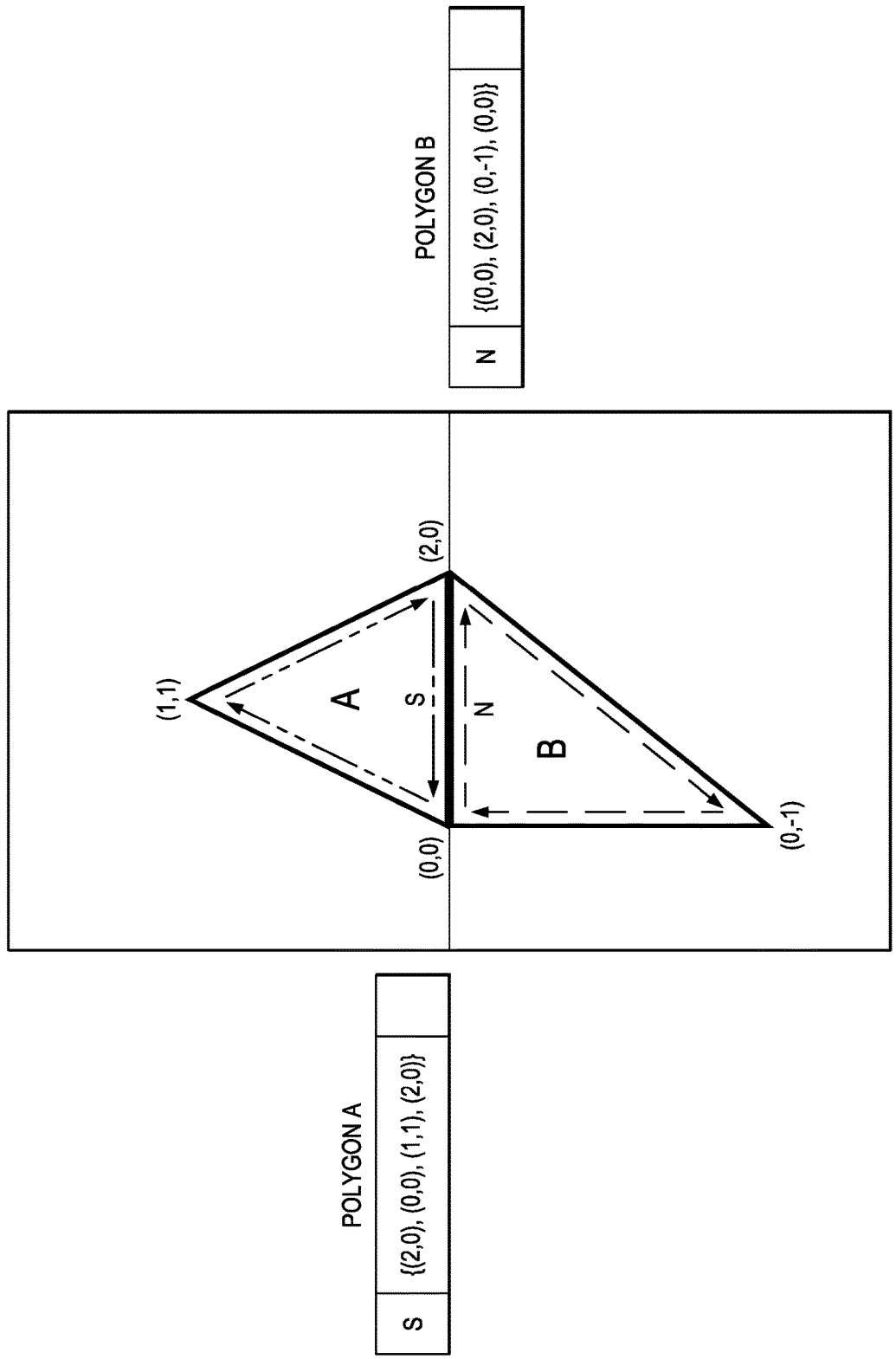
Figure 14:
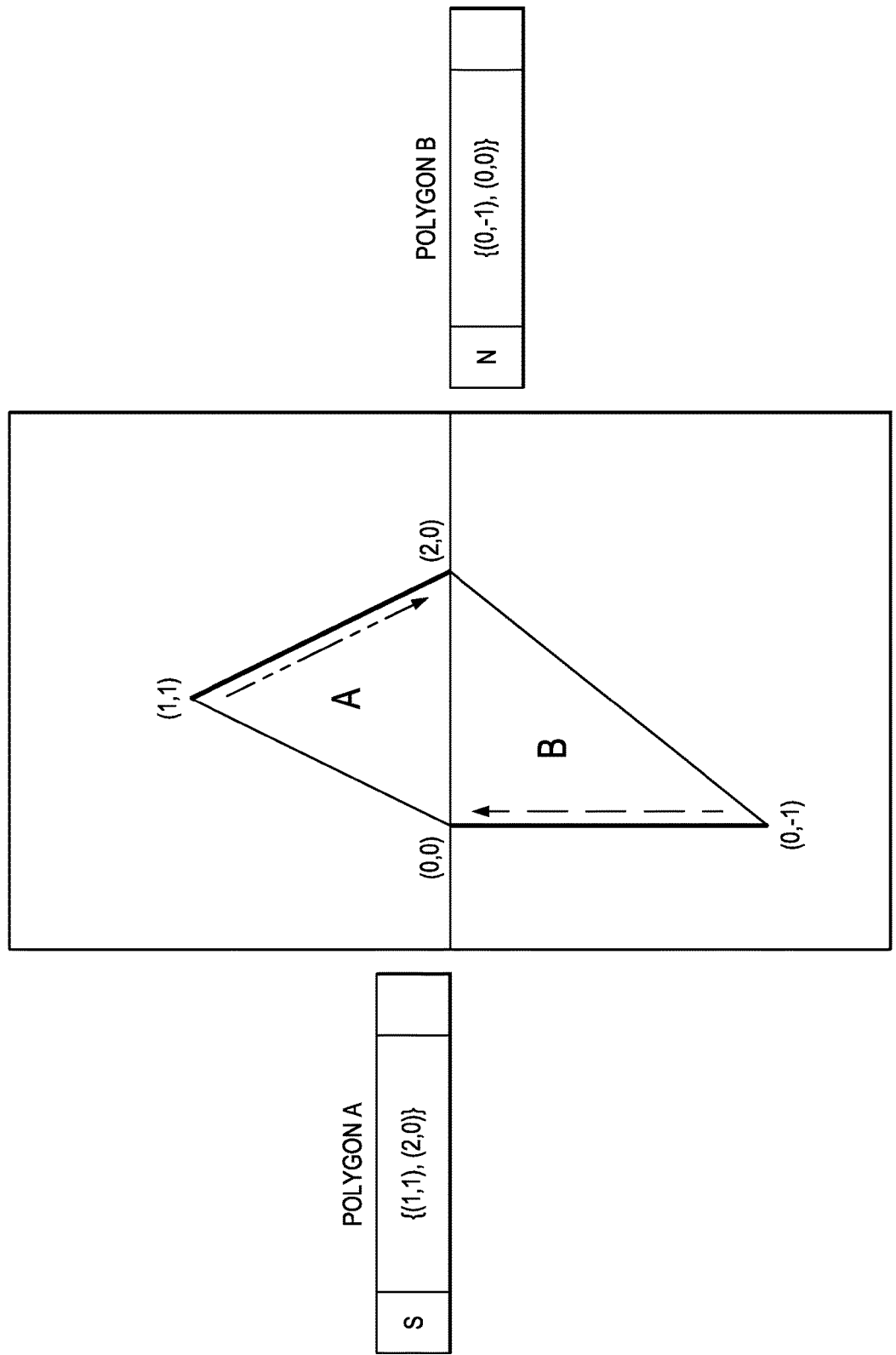
Figure 15:
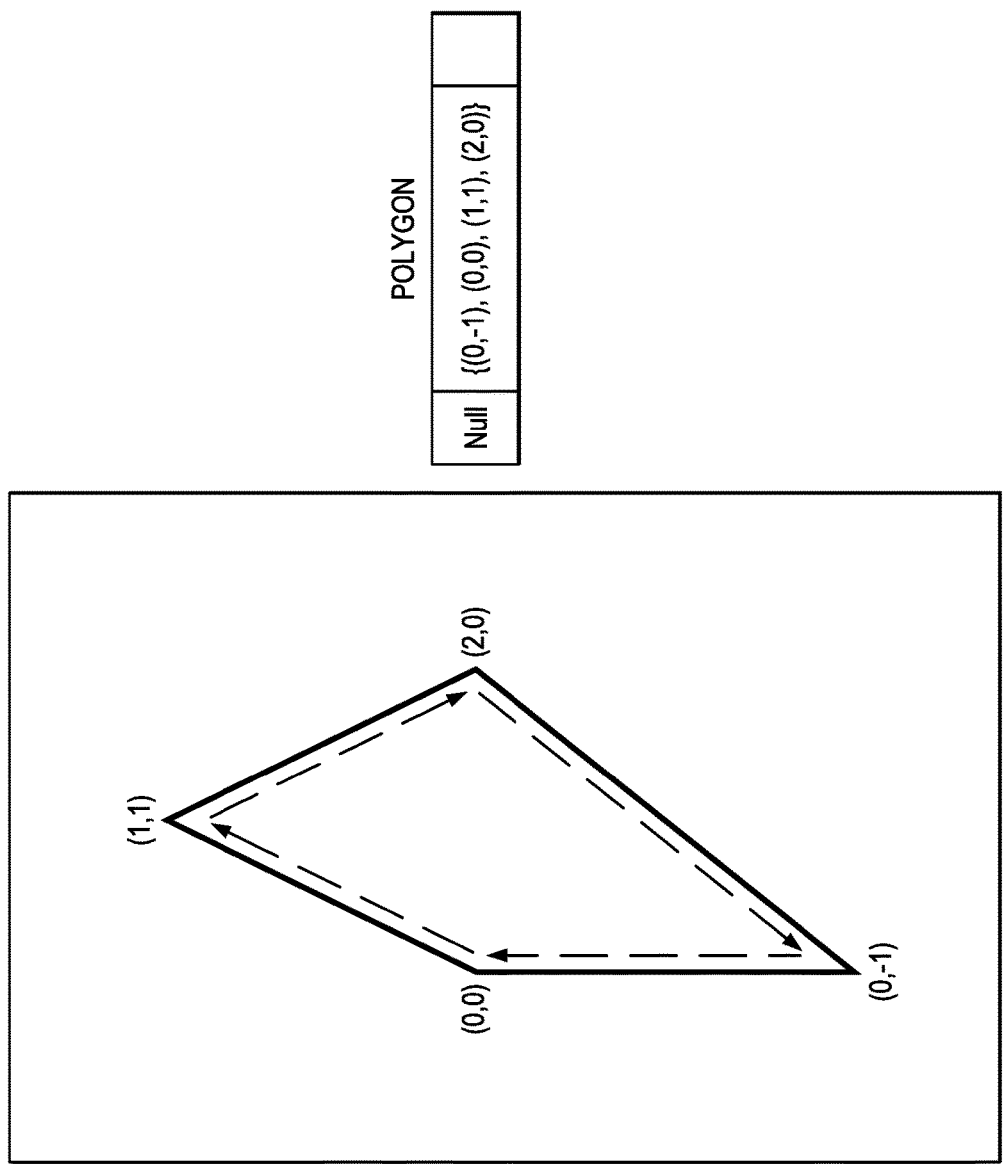
Figure 16:
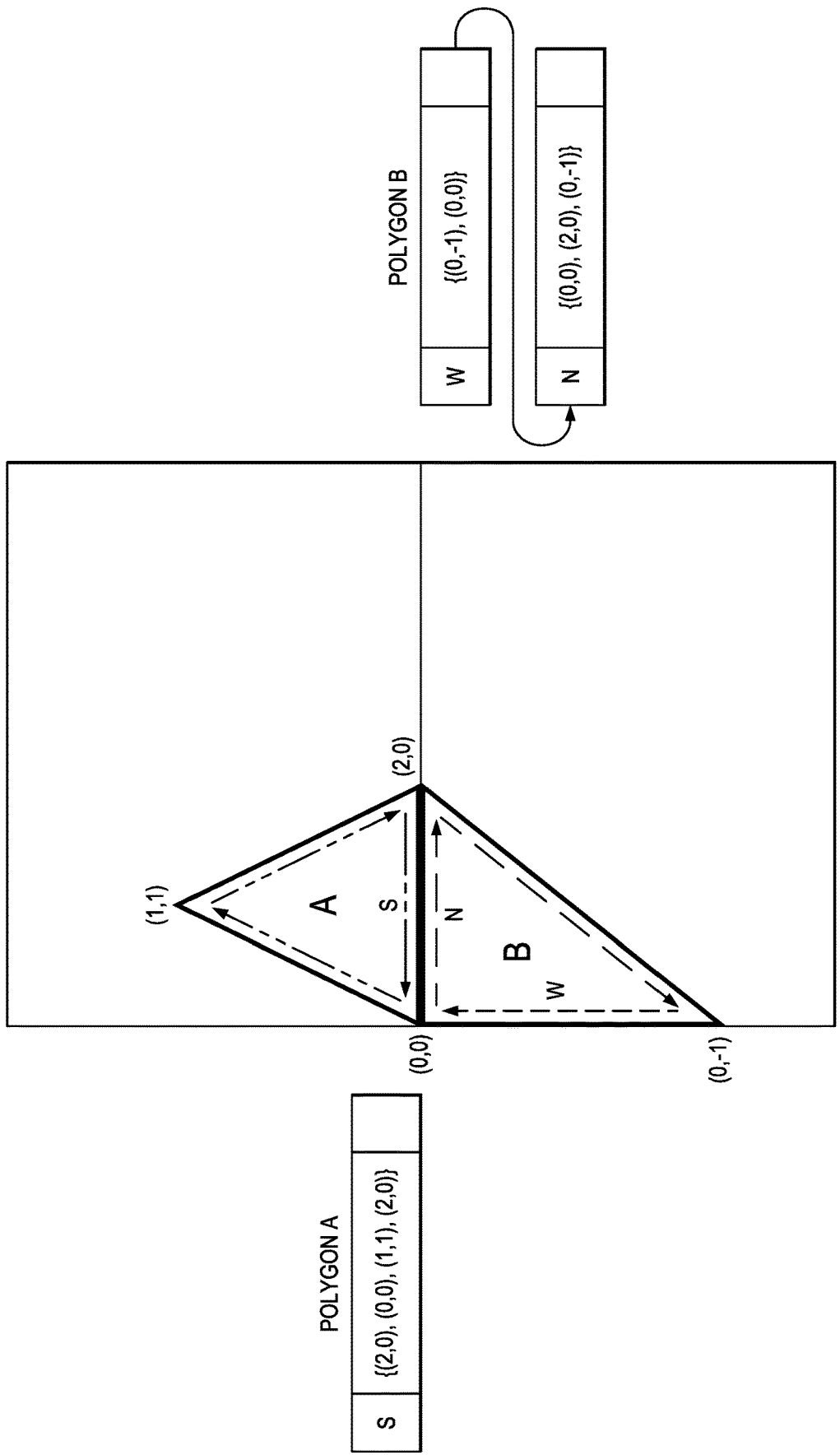

In the example of FIGS. 6-12, two rectangular polygons A and B are merged. As illustrated in FIG. 6, polygon A has a west edge and a south edge and polygon B has a west edge and a north edge. In the example of FIGS. 13-15, two polygons with single edges are merged. As illustrated in FIG. 13, polygon A has a single south edge and polygon B has a single north edge. In the example of FIGS. 16-20, a polygon with a single edge and a polygon with more than one edge are merged. As illustrated in FIG. 16, polygon A has a single south edge and polygon B has a west edge and north edge. In the example of FIGS. 21-29, two polygons in which the edge of one polygon is longer than the edge of the other polygon are merged. As illustrated in FIG. 21, polygon A has a south edge and a west edge and polygon B has a north edge and a west edge. Further the south edge of polygon A is longer than the north edge of polygon B.

Referring first to FIG. 3, initially, polygons in the adjacent tiles that are candidates for merging are identified 300. That is, the polygons in the adjacent tiles are searched to identify polygons that would have invalid edges in the larger tile formed by merging the two adjacent tiles. An edge is considered to be invalid if the edge is on the boundary of a tile that will be eliminated when the tiles are merged into a single larger tile. For example, in FIG. 2, polygon 200 and polygon 202 would each have an invalid south edge and polygon 204 would have an invalid north edge. In other examples, in FIG. 6, FIG. 13, FIG. 16, and FIG. 21, polygon A has an invalid south edge and polygon B has an invalid north edge.

The candidate polygons are then searched 302 to identify two candidate polygons with matching invalid edges. Invalid edges are considered to match if the types of the edges are opposite, i.e., one edge is a north edge and the other is a south edge or one edge is an east edge and the other is a west edge. For example, in FIG. 2, the invalid south edge of polygon 200 and the invalid north edge of polygon 204 would be considered to match. In addition, the invalid south edge of polygon 202 and the invalid north edge of polygon 204 would be considered to match. In FIG. 6, FIG. 13, FIG. 16, and FIG. 21, the invalid south edge of polygon A would be considered to match the invalid north edge of polygon B.

If matching invalid edges are found 304, the invalid edges are checked 306 to determine if the two invalid edges overlap. Invalid edges are considered to overlap if there is overlap between the coordinates of the initial two points in each of the edges. As previously mentioned, the initial two points of an edge lie on the tile boundary that corresponds to the type of the edge. In FIG. 2, the invalid edges of polygon 200 and polygon 204 would be considered to overlap while the invalid edges of polygon 202 and polygon 204 would not be considered to overlap. In FIG. 6, FIG. 13, FIG. 16, and FIG. 21, the invalid edges of polygon A and polygon B would be considered to overlap.

If the two matching invalid edges do not overlap 306, then another search 302 for matching invalid edges is performed. If the matching invalid edges do overlap 306, then the two candidate polygons are merged 308 at the overlapping edges. After the polygons are merged, another search 302 for matching invalid edges is performed 302. Merging of two polygons with matching invalid edges is explained in reference to the methods of FIG. 4 and FIG. 5.

If matching invalid edge types are not found 304, then all possible polygon merges have been performed. Any remaining unmatched invalid edges are removed 310 from the polygons including the unmatched invalid edge types and the method terminated. When an unmatched invalid edge type is removed from a polygon edge linked list, the point coordinates of the removed edge are added to another edge in the polygon edge linked list unless the unmatched invalid edge is the only edge in the edge linked list. If the unmatched invalid edge is the only edge in the edge linked list, the edge type is changed to Null. For example, when the adjacent tiles have shared north south boundaries, any unmatched south edge in the north tile and any unmatched north edge in the south tile are removed from the polygons having these edges as such edges are no longer valid in the larger tile formed by combining the north tile and the south tile. In the example of FIG. 2, polygon 202 has an unmatched south edge. That south edge is removed from the edge linked list corresponding to polygon 202, leaving a north edge and an east edge. The point coordinates from the removed south edge are added to the east edge.

FIG. 4 is a flow diagram of a method for merging two polygons with matched overlapping invalid edges. For convenience of description, the two polygons are referred to as polygon A and polygon B. Initially, a check 400 is made to determine if the edges match exactly. Edges match exactly if the initial two points in the edges have the same coordinates. For example, in FIG. 6, the coordinates of the initial two points of the south edge of polygon A and the coordinates of the initial two point of the north edge of polygon B are the same. The same is true of the polygons in FIG. 13 and FIG. 16. However, in FIG. 21, the matched overlapping invalid edges of the polygons do not match exactly.

Figure 21:
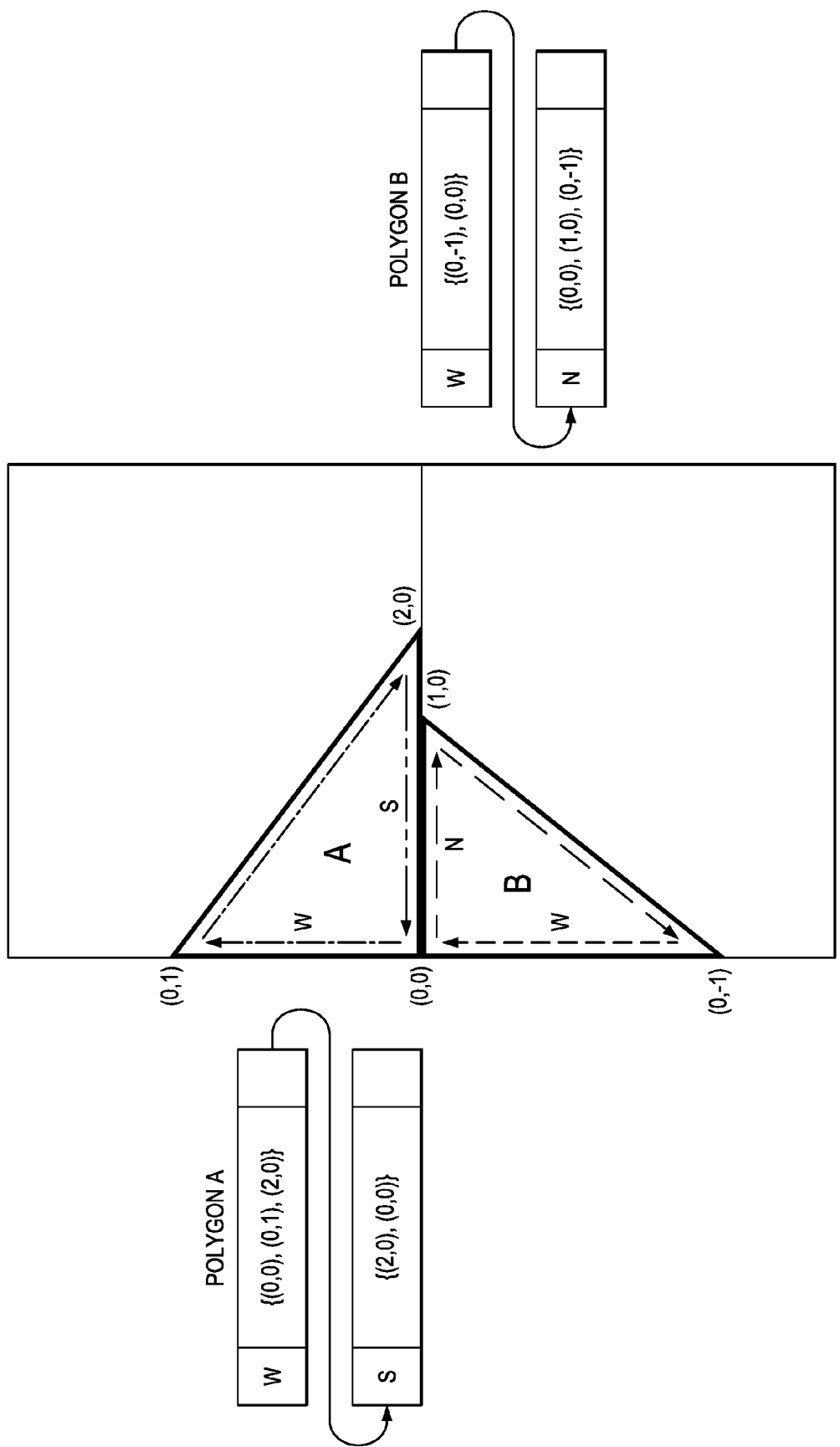
Figure 22:
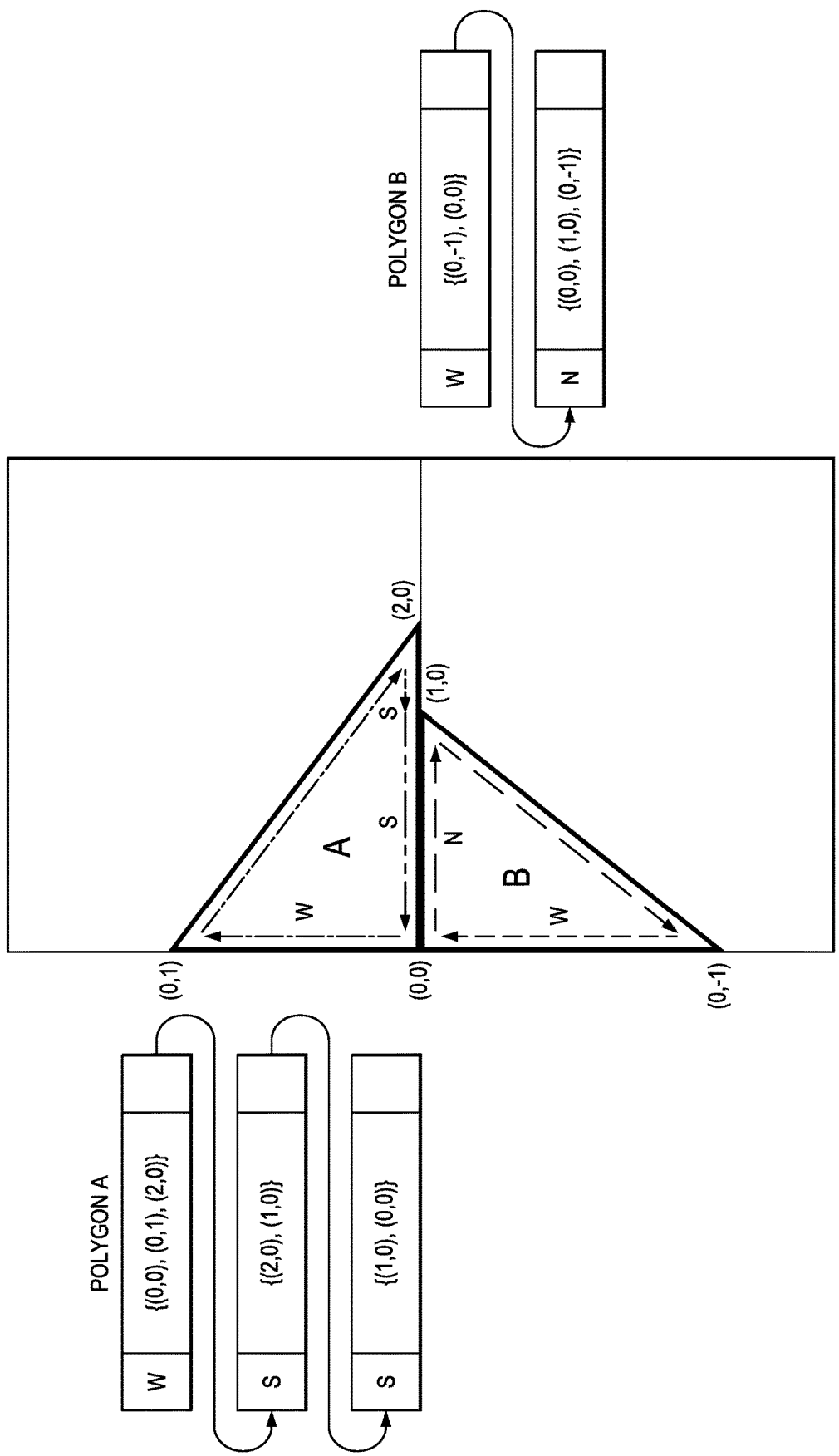

If the edges do not match exactly, then one or both of the edges are split 402 into two or more edges of the same type such that each of the polygons have edges that exactly match, i.e., the initial two point coordinates of the matching edges are the same. There are three scenarios for edge splitting: 1) the edge of one polygon needs to be split one time; 2) the edge of one polygon needs to be split twice; and 3) the edges of both polygons need to be split once. FIGS. 21 and 22 illustrate splitting in the first scenario. In FIG. 21, the south edge of polygon A is longer than the matching north edge of polygon B. As illustrated in FIG. 22, the existing south edge of polygon A is split by shortening the edge such that the edge has the same initial two point coordinates as the north edge of polygon B and an additional south edge is added to the edge linked list for polygon A to cover the remaining portion of the previously longer edge.

Note that the clockwise ordering of the edges is maintained when the new south edge is added. The other two edge splitting scenarios are described below in reference to the examples of FIGS. 30-32 and FIGS. 33-35.

If there is an exact edge match 400 or after the edge splitting 404, a check 404 is made to determine if one or both of the polygons is a single edge polygon. In FIG. 13, both polygons are single edge polygons. In FIG. 16, polygon A is a single edge polygon while polygon B is not. If one or both of the polygons is a single edge polygon, then a single edge polygon merger is performed 418. Merging of single edge polygons is described below in reference to the method of FIG. 5.

Figure 7:
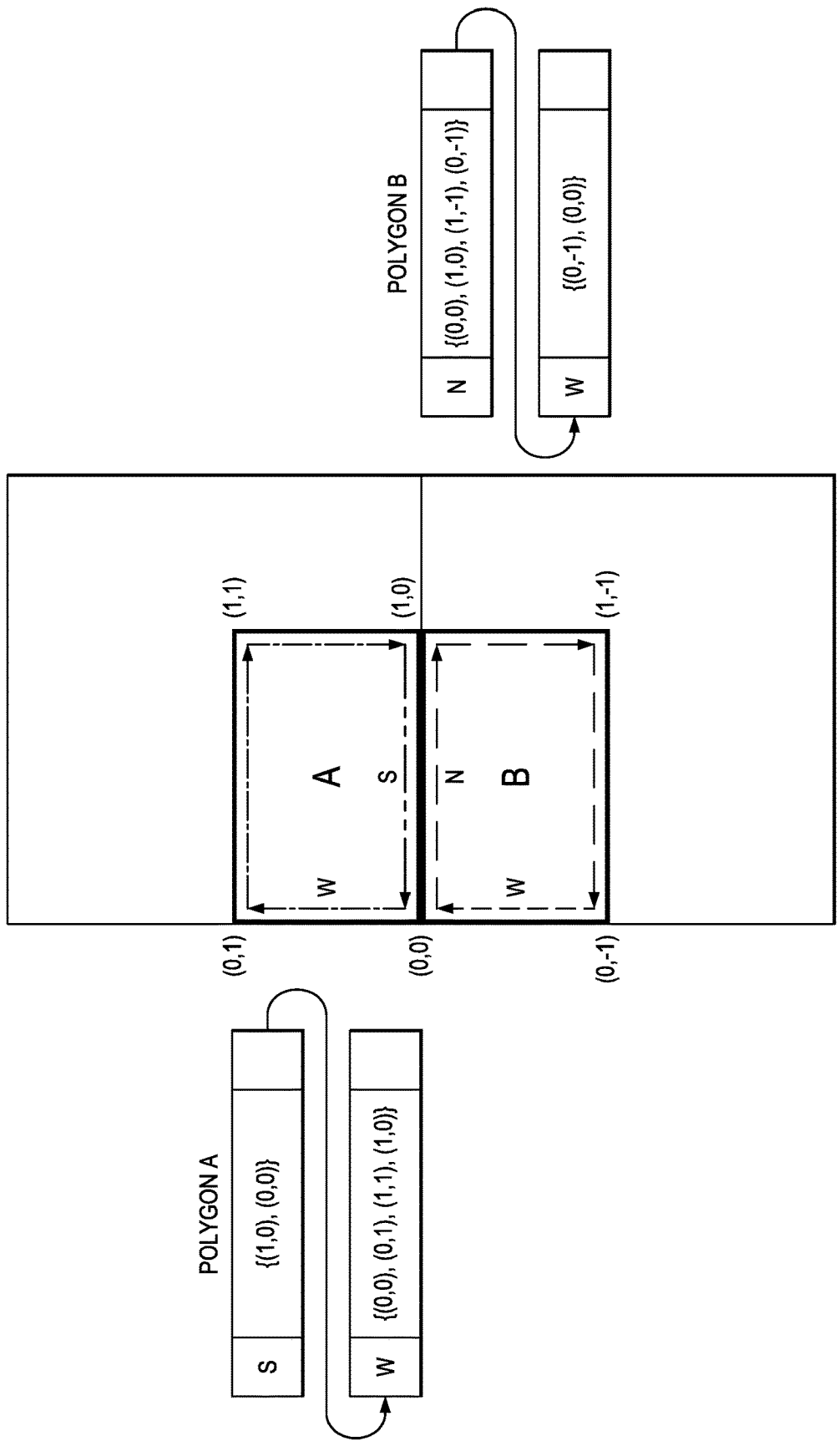
Figure 23:
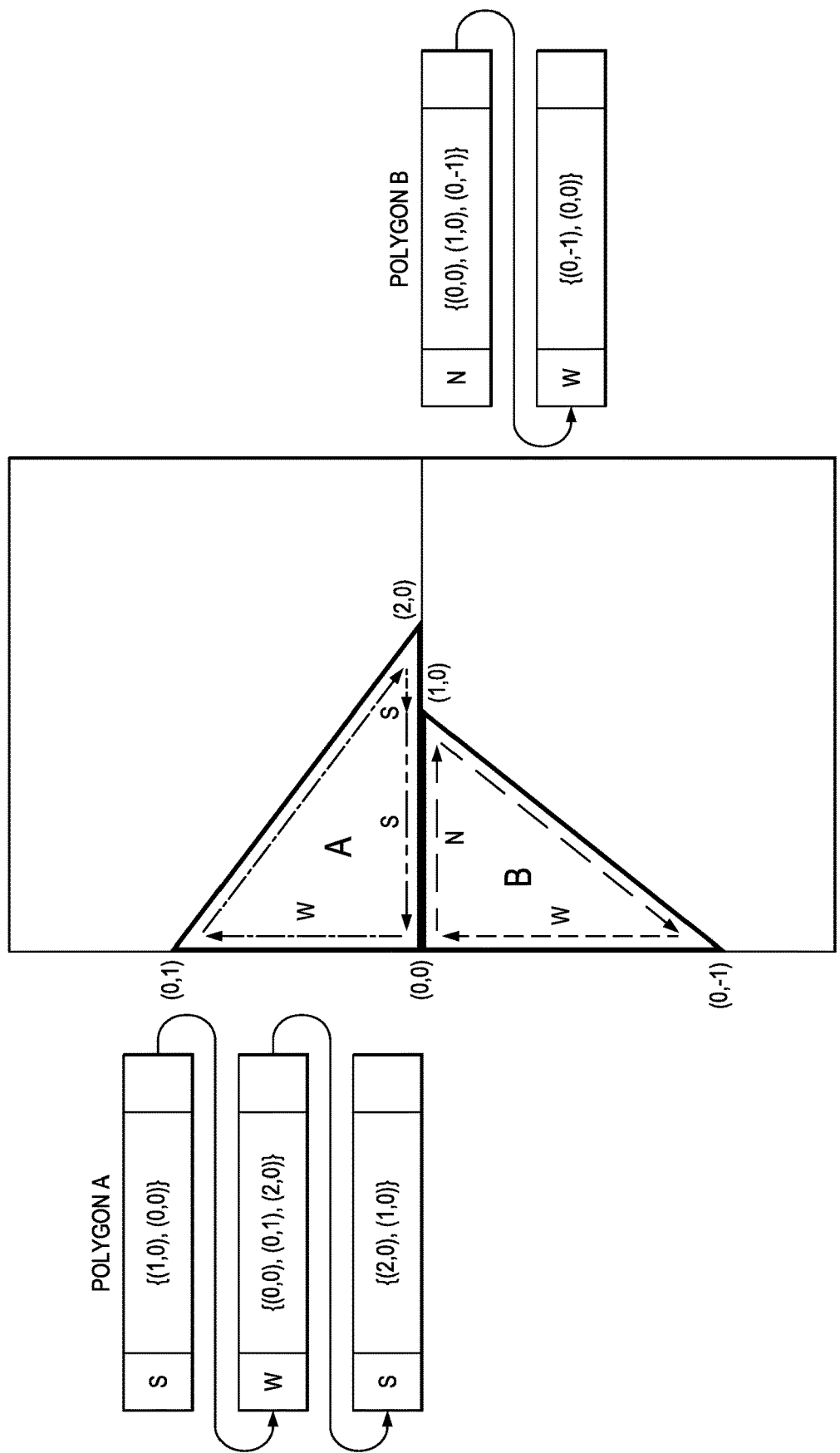

If neither of the polygons is a single edge polygon 404, then the edge linked lists of the polygons are rotated 406 so that the matching edges are the initial edges in each edge linked list. The rotation maintains the clockwise ordering of the edges. FIG. 7 shows the edge linked lists for each of the polygons of FIG. 6 after the rotation. FIG. 23 shows the edge linked lists for each of the polygons of FIG. 22 after the rotation.

After the edge linked lists are rotated, all point coordinates except the initial two in the initial edge of the edge linked list of polygon A are copied 408 to the last edge of the edge linked list of polygon B. In addition, all point coordinates except the initial two in the initial edge of the edge linked list of polygon B are copied 410 to the last edge of the edge linked list of polygon A. The copied point coordinates are added to the end of the set of point coordinates of the last edge to maintain the clockwise ordering of the point coordinates.

Figure 8:
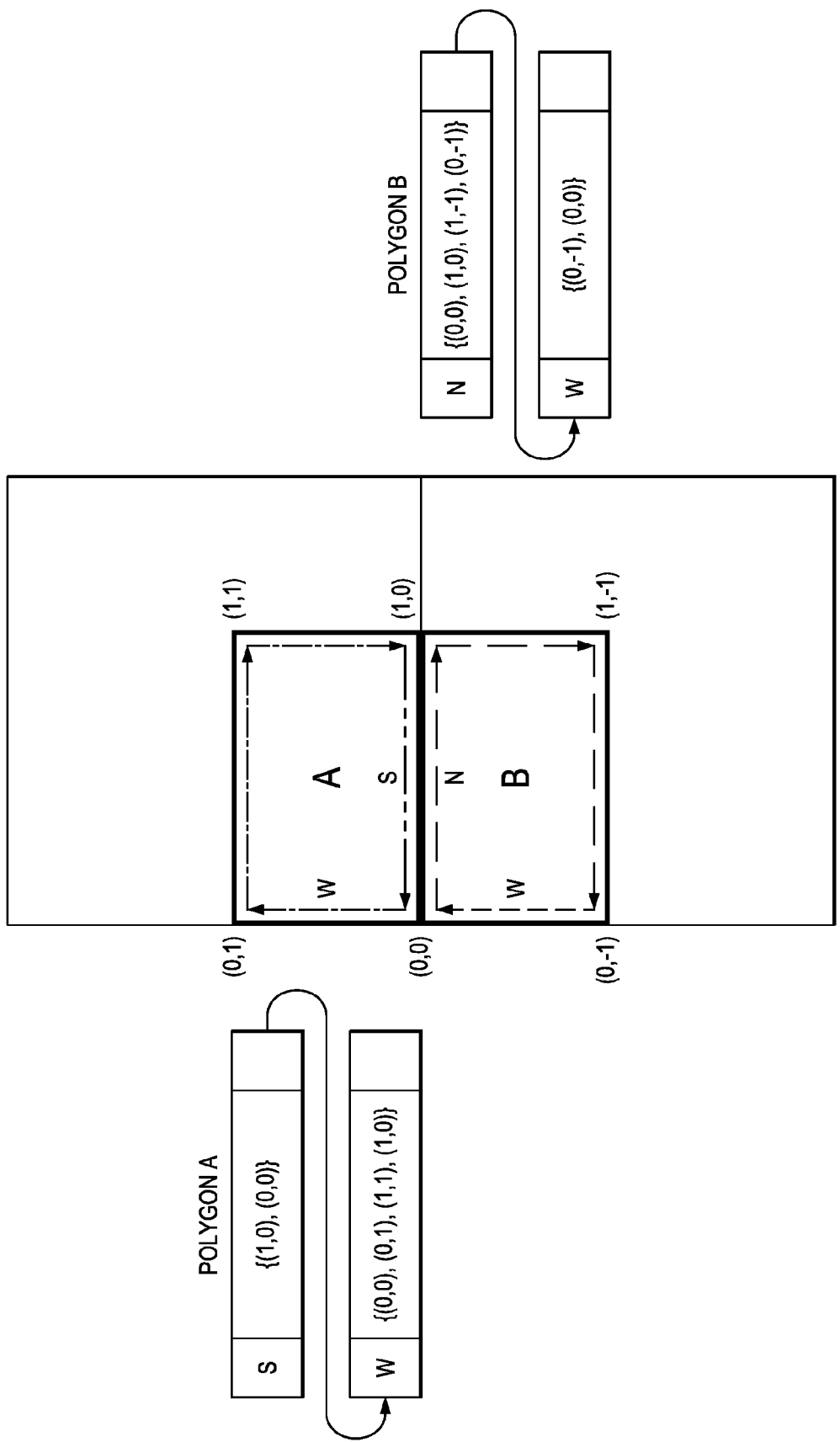
Figure 9:
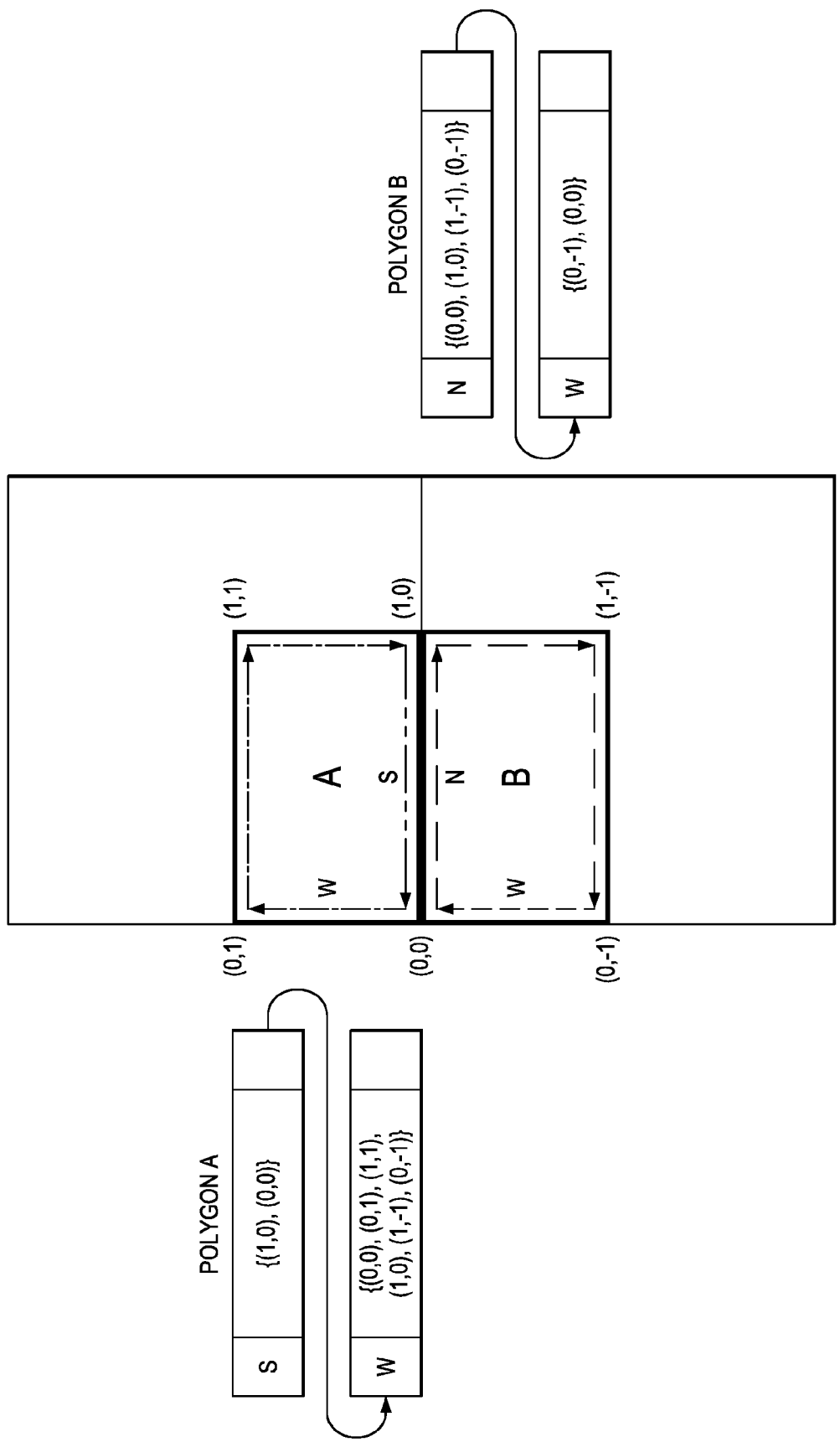

For example, FIG. 8 shows the edge linked lists for each of the polygons of FIG. 7 after the copy from the first edge of polygon A. The first (south) edge of the edge linked list of polygon A has only two point coordinates, so no copy is performed and nothing is changed in the edge linked list of polygon B. FIG. 9 shows the edge linked lists for each of the polygons of FIG. 8 after the copy from the first edge of polygon B to the last edge of polygon A. The first (north) edge of polygon B includes four point coordinates, so the last two point coordinates are copied to the last (west) edge of polygon A.

Figure 24:
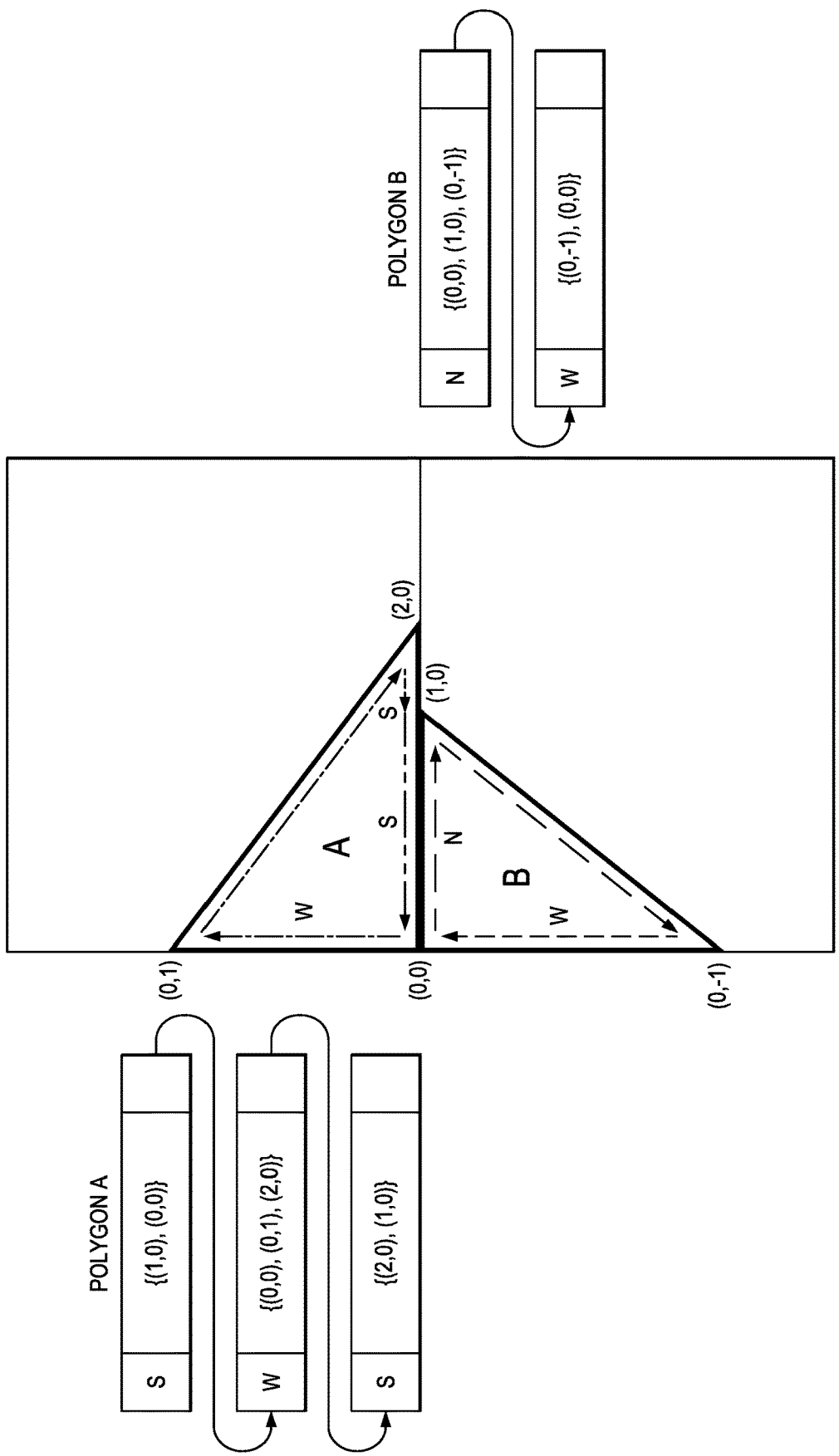
Figure 25:
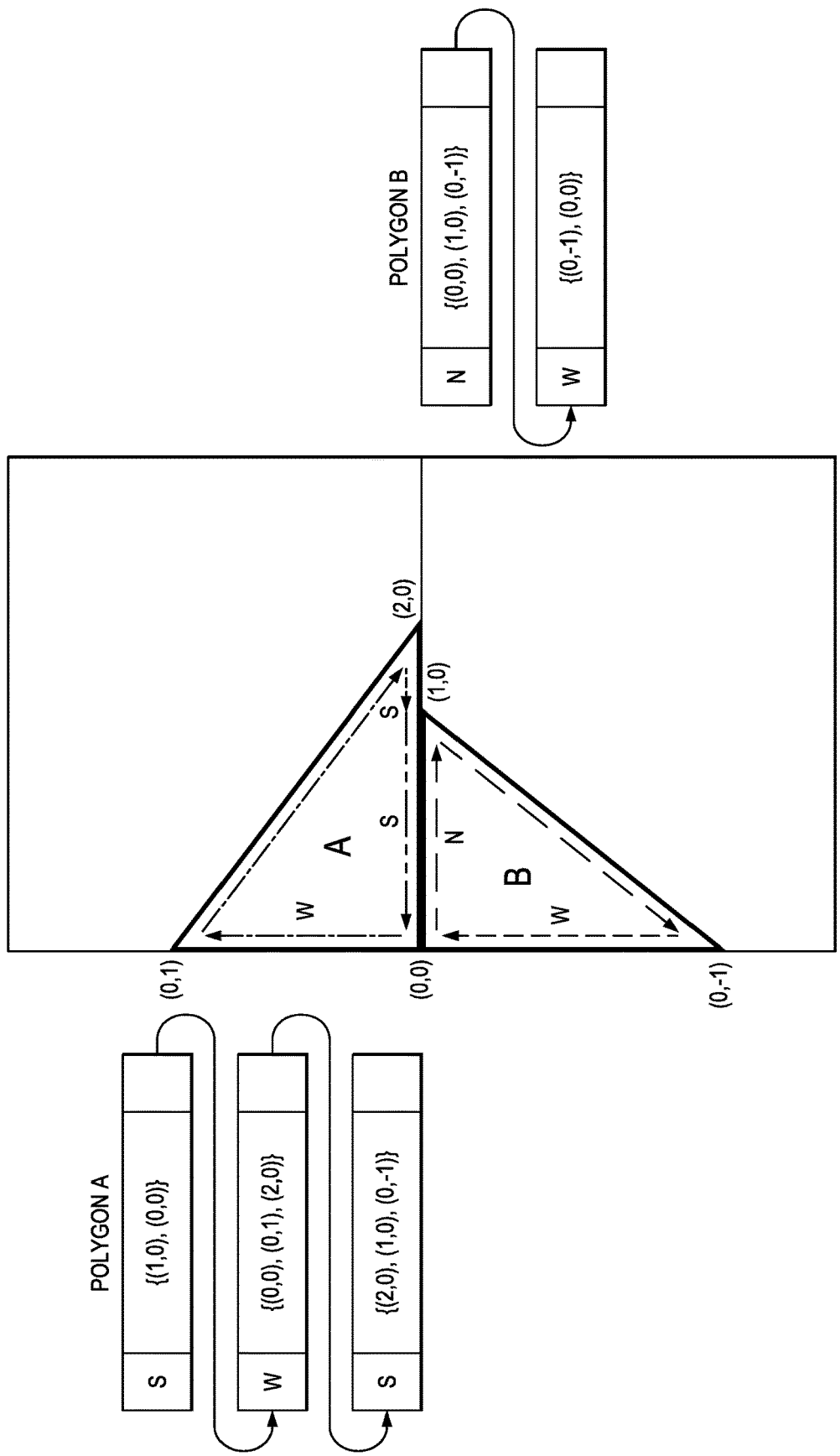

In another example, FIG. 24 shows the edge linked lists for each of the polygons of FIG. 23 after the copy from the initial edge of polygon A. The initial (south) edge of the edge linked list of polygon A has only two point coordinates, so no copy is performed and nothing is changed in the edge linked list of polygon B. FIG. 25 shows the edge linked lists for each of the polygons of FIG. 24 after the copy from the initial edge of polygon B to the last edge of polygon A. The initial (north) edge of polygon B includes three point coordinates, so the last point coordinates are copied to the last (south) edge of polygon A.

Figure 10:
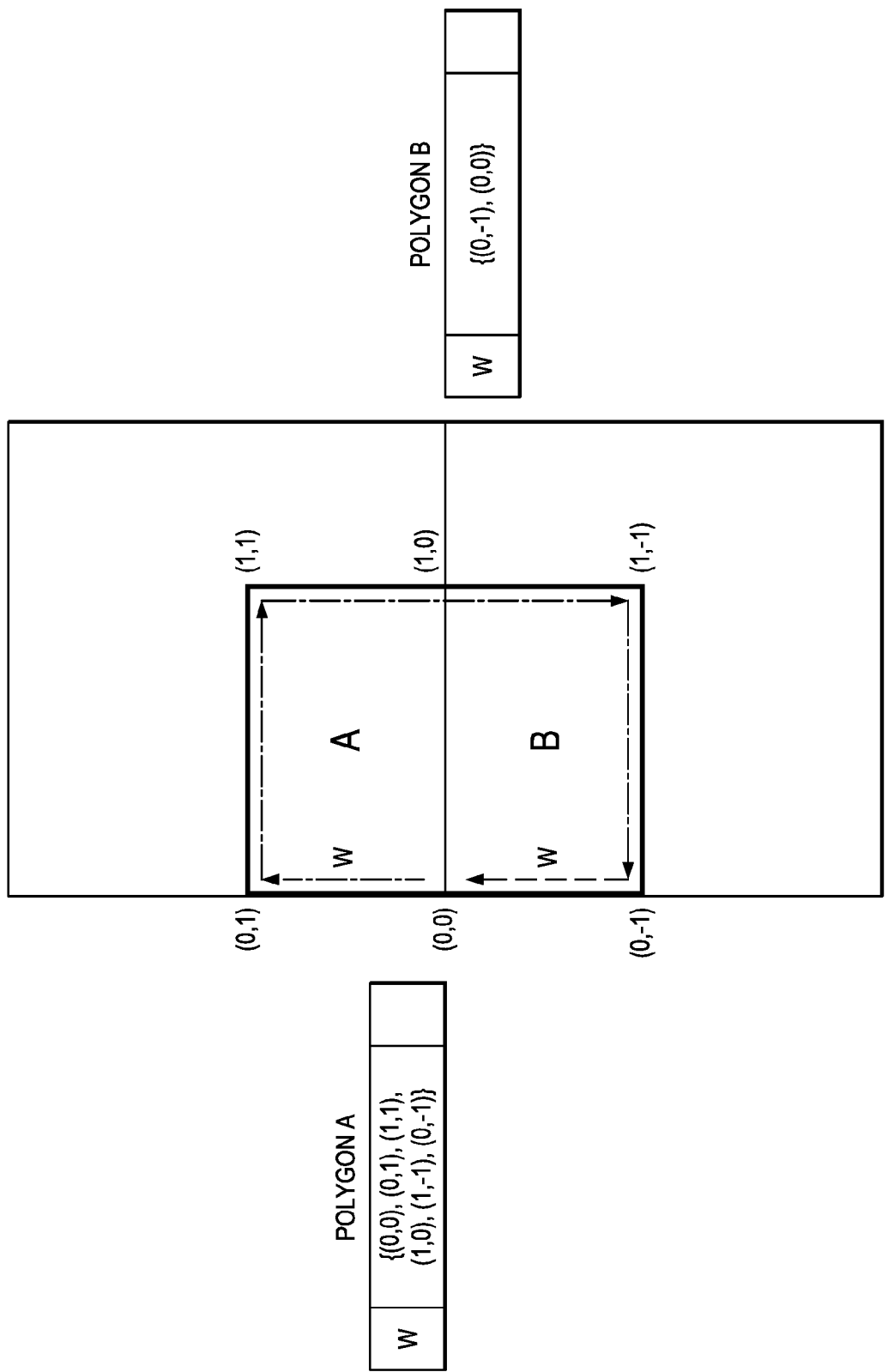
Figure 26:
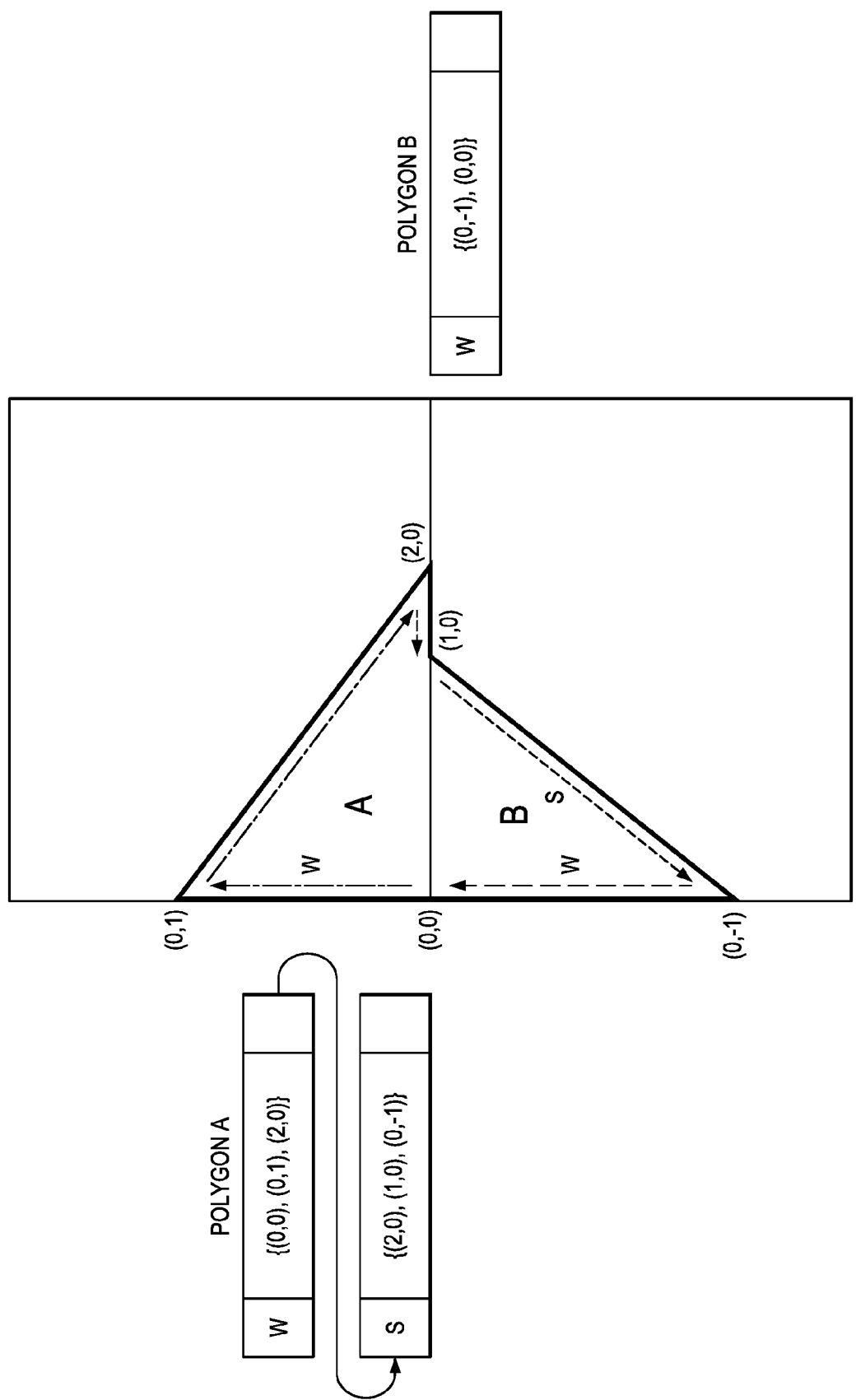
Figure 27:
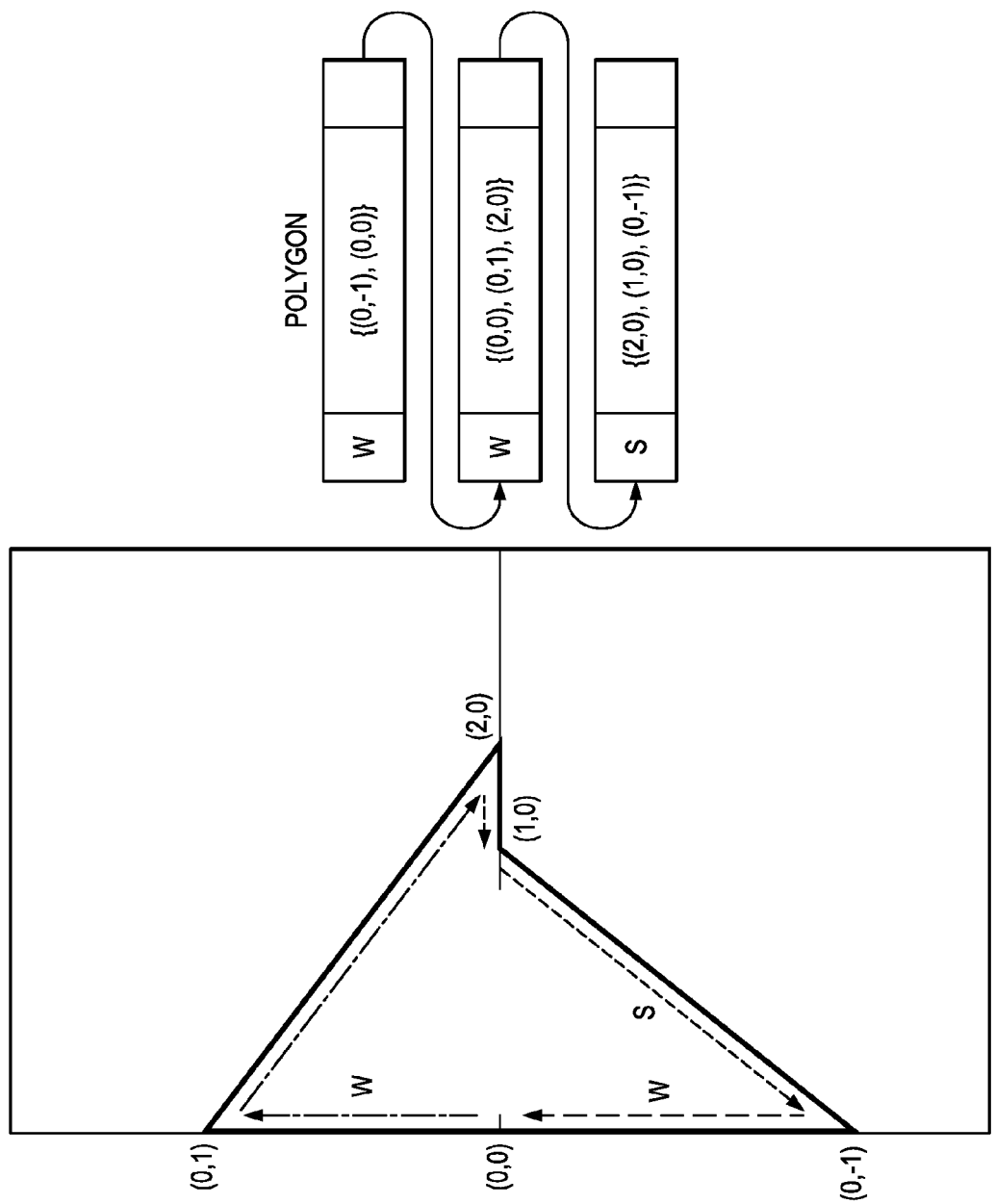

After the copies of the point coordinates, the initial edge is deleted 412 from the edge linked lists of both polygons and the edge linked list of polygon A is added 414 to the end of the edge linked list of polygon B to create a final edge linked list for the merged polygon. For example, FIG. 10 shows the edge linked lists of each of the polygons of FIG. 9 after the initial edge is deleted from the edge linked list of each polygon and FIG. 11 shows the edge linked list after the edge linked list of polygon A is added to the end of the edge linked list of polygon B. In another example, FIG. 26 shows the edge linked lists of each of the polygons of FIG. 25 after the initial edge is deleted from the edge linked list of each polygon and FIG. 27 shows the edge linked list after the edge linked list of polygon A is added to the end of the edge linked list of polygon B.

Figure 28:
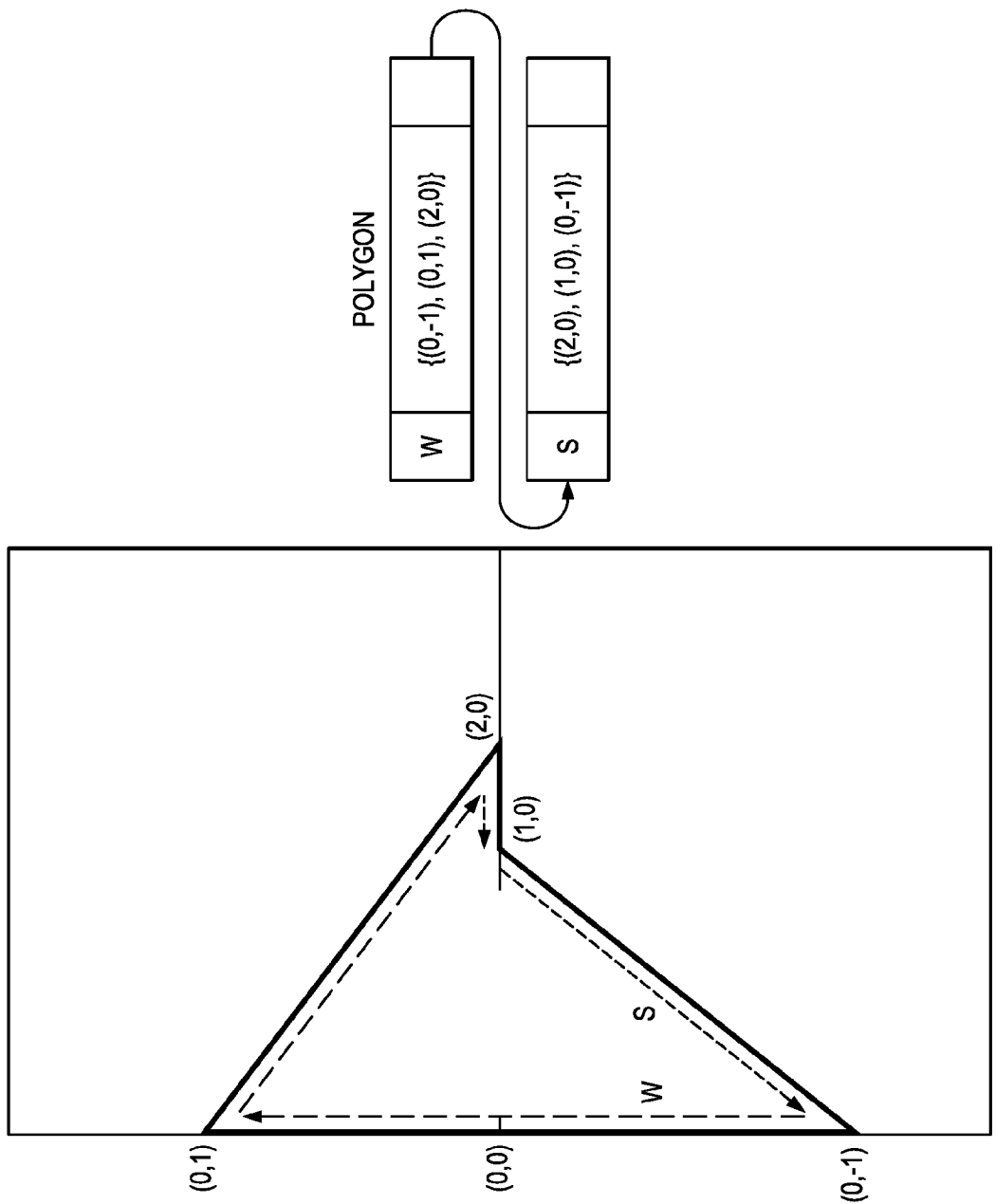
Figure 29:
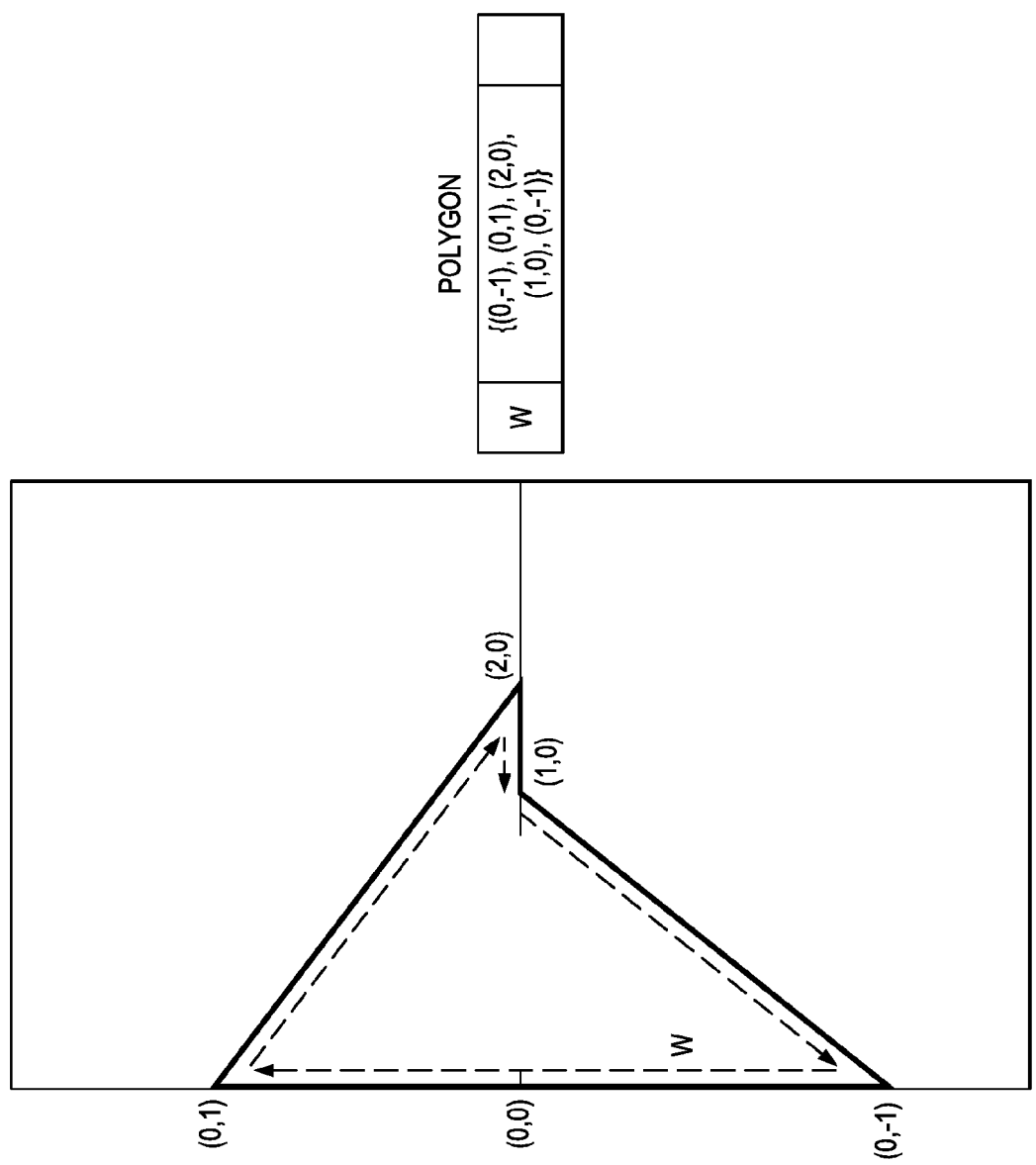

Finally, any edges in the final edge linked list of the merged polygon that lie on the same tile boundary are combined 416 into a single edge. For example, as illustrated in FIG. 11, the merged polygon has two west edges. These two edges are combined to create a single west edge as illustrated in FIG. 12. In another example, as illustrated in FIG. 27, the merged polygon has two west edges. These two edges are combined to create a single west edge as illustrated in FIG. 28. Note that in the example of FIG. 28, there will be an unmatched invalid (south) edge that will be removed as per step 310 of the method of FIG. 3, resulting in the single edge tile of FIG. 29.

FIG. 5 is a flow diagram of a method for merging two polygons in adjacent tile when one or both polygons are single edge polygons. Initially, a check 500 is made to determine if both polygons are single edge polygons. If the both polygons are single edge polygons, then the initial two point coordinates in the set of point coordinates in the edge linked lists of each polygon are deleted 510, the resulting set of points in the edge linked list of polygon A is added to the end of the set of point coordinates of the edge linked list of polygon B, and the edge type of the edge linked list of the resulting polygon is set to Null as the resulting polygon will have no valid edges in the merged tile. For example, FIGS. 13-15 are an example of merging two single edge polygons. FIG. 14 shows the edge linked lists of each of the single edge polygons of FIG. 13 after the initial two point coordinates in the single edges are deleted, and FIG. 15 shows the edge linked list of the resulting polygon after the set of points of the edge linked list of polygon A is added to the end of the set of point of the edge linked list of polygon B.

If only one polygon is a single edge polygon 500, then the edge linked list of the polygon with more than one edge, i.e., polygon B, is rotated 502 so that the matching edge is the initial edge in the edge linked list of the polygon. The rotation maintains the clockwise ordering of the edges. After the edge linked list is rotated, all point coordinates except the initial two in the single edge of the edge linked list of polygon A are copied 504 to the last edge of the edge linked list of polygon B. In addition, all point coordinates except the initial two in the initial edge of the edge linked list of polygon B are copied 506 to the last edge of the edge linked list. The copied point coordinates are added to the end of the set of point coordinates of the last edge to maintain the clockwise ordering of the point coordinates. Finally, the initial edge in the edge linked list of polygon B is deleted 508 to form the edge linked list for the resulting merged polygon.

Figure 17:
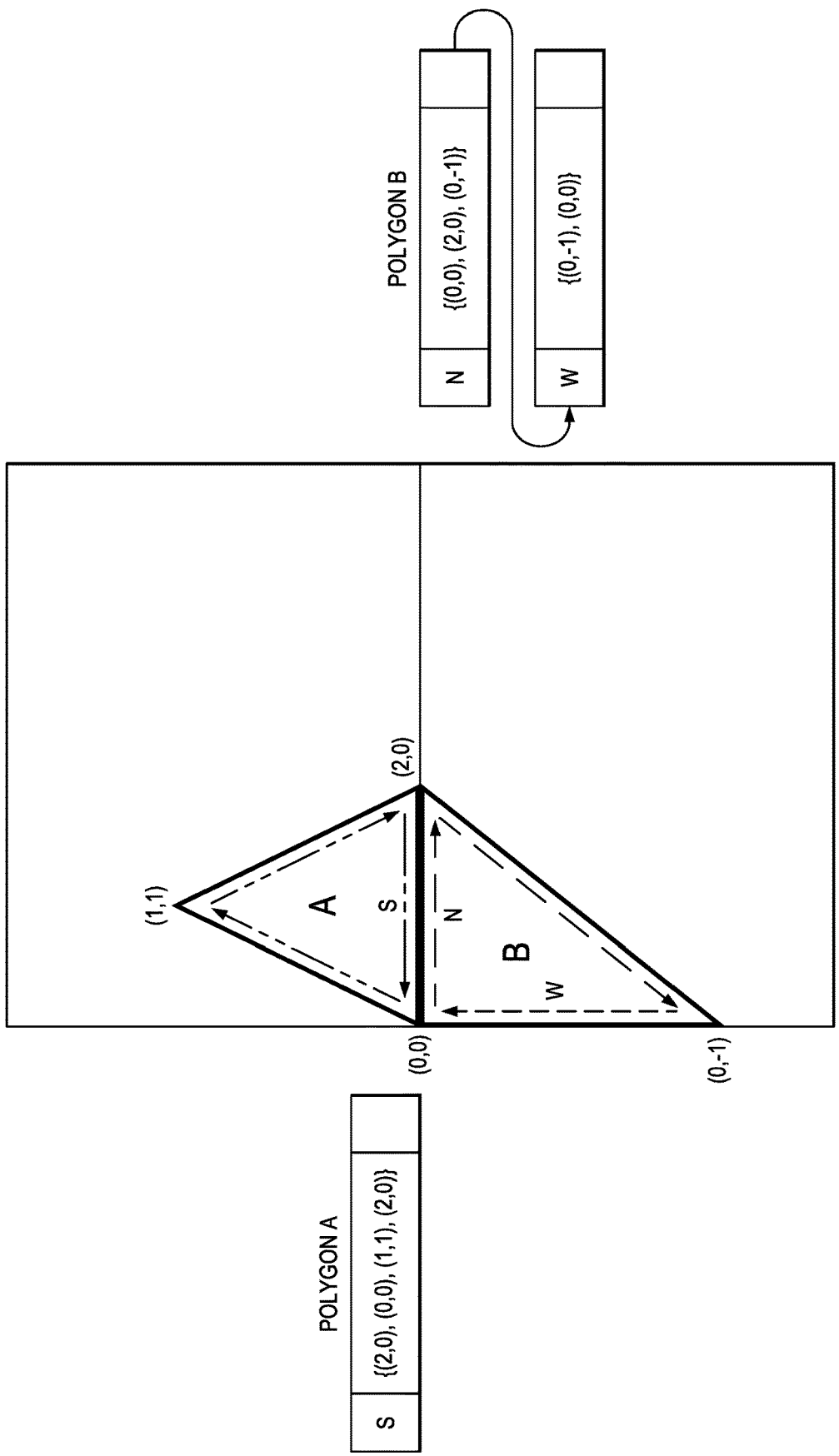
Figure 18:
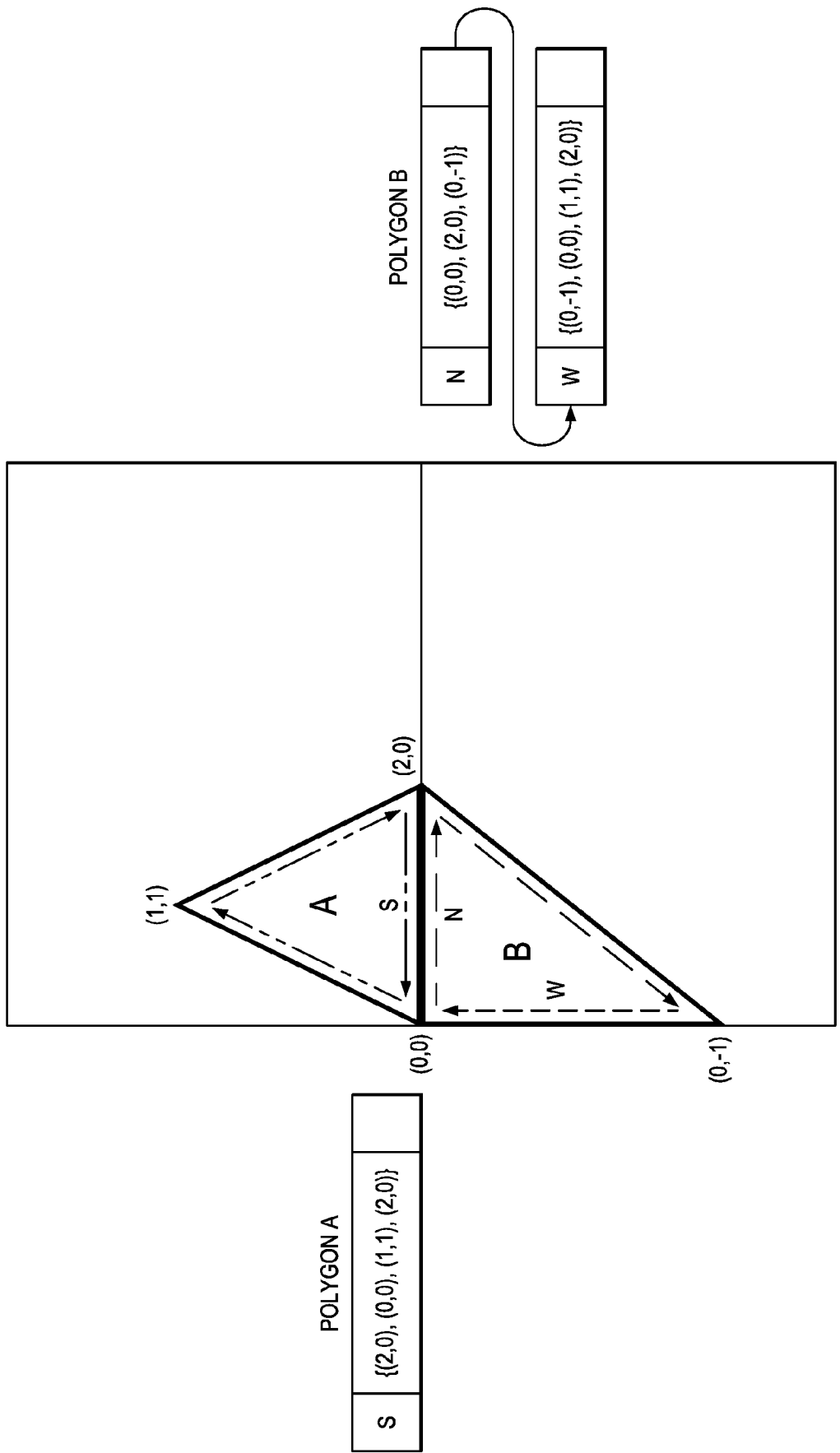
Figure 19:
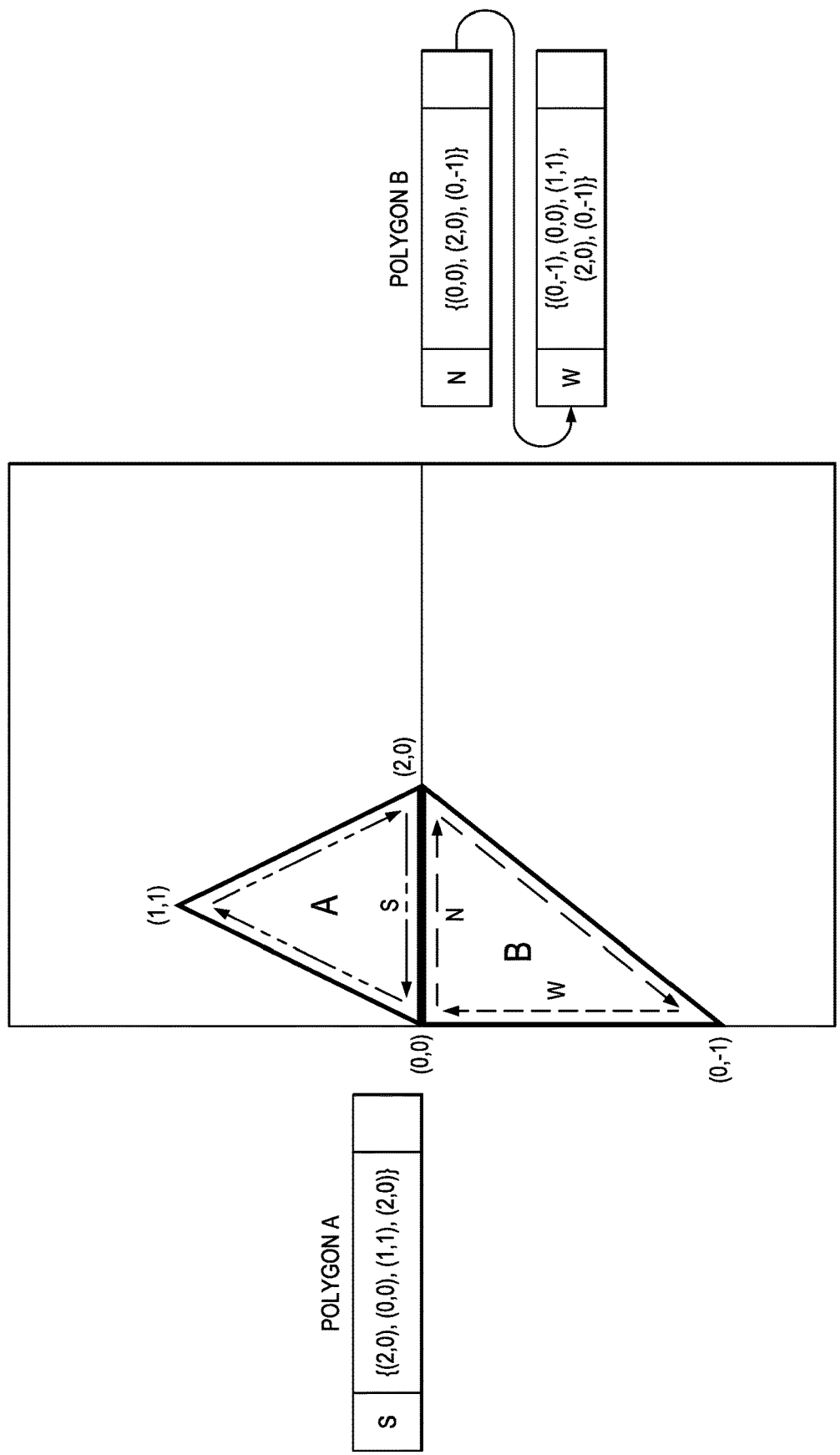
Figure 20:
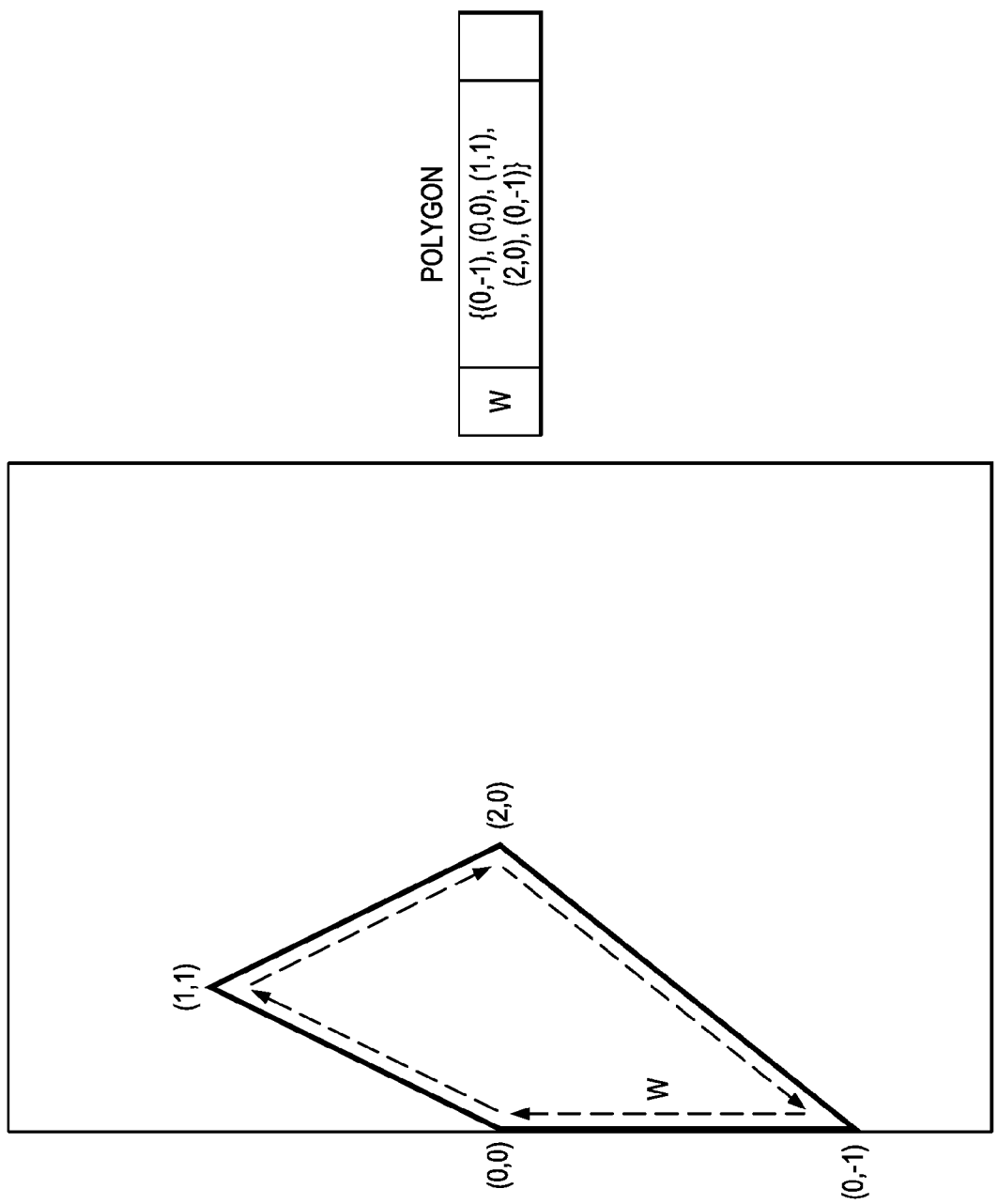

FIGS. 16-20 are an example illustrating merging of a single edge polygon A and a multi-edge polygon B. FIG. 17 shows the edge linked lists of each of the polygons of FIG. 16 after the edge linked list of polygon B is rotated. FIG. 18 shows the edge linked lists of each of the polygons of FIG. 17 after all point coordinates except the initial two in the single edge of polygon A are copied to the last edge of polygon B. FIG. 19 shows the edge linked lists of each of the polygons of FIG. 18 after all point coordinates except the initial two in the initial edge of polygon B are copied to the last edge of polygon B. FIG. 20 shows the final edge linked list for the merged polygon after the initial edge in the edge linked list of polygon B is deleted.

Figure 30:
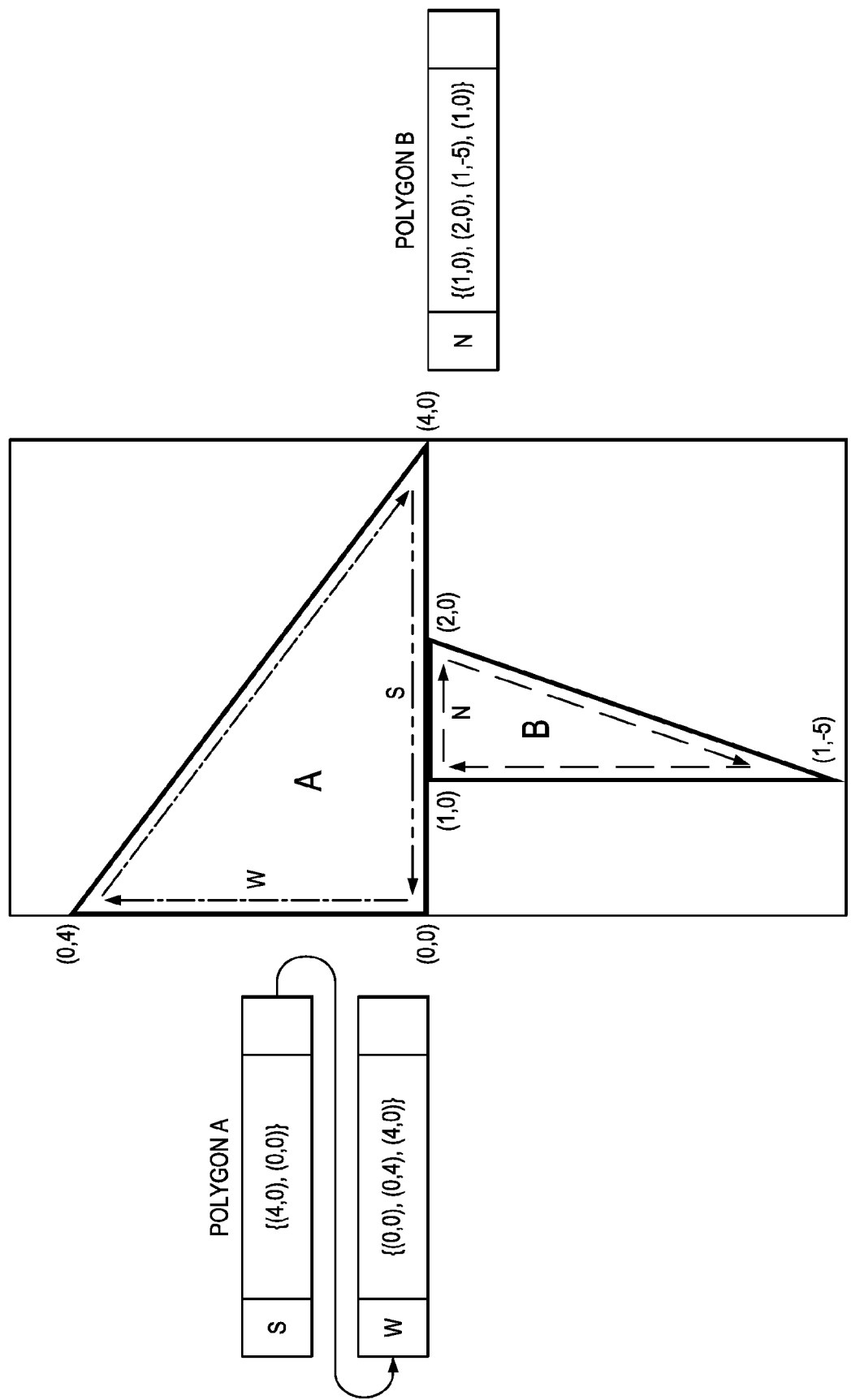
Figure 31:
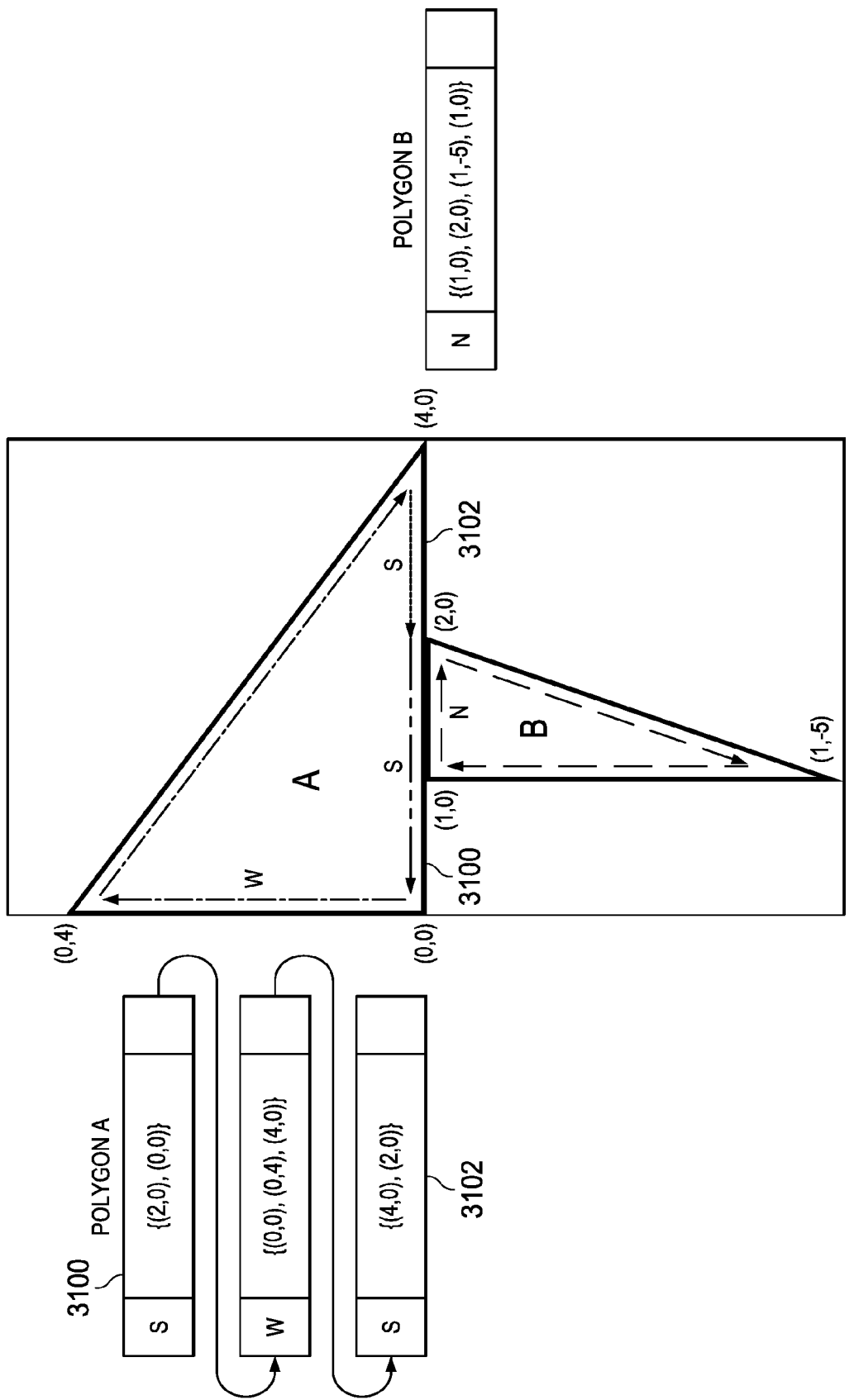
Figure 32:
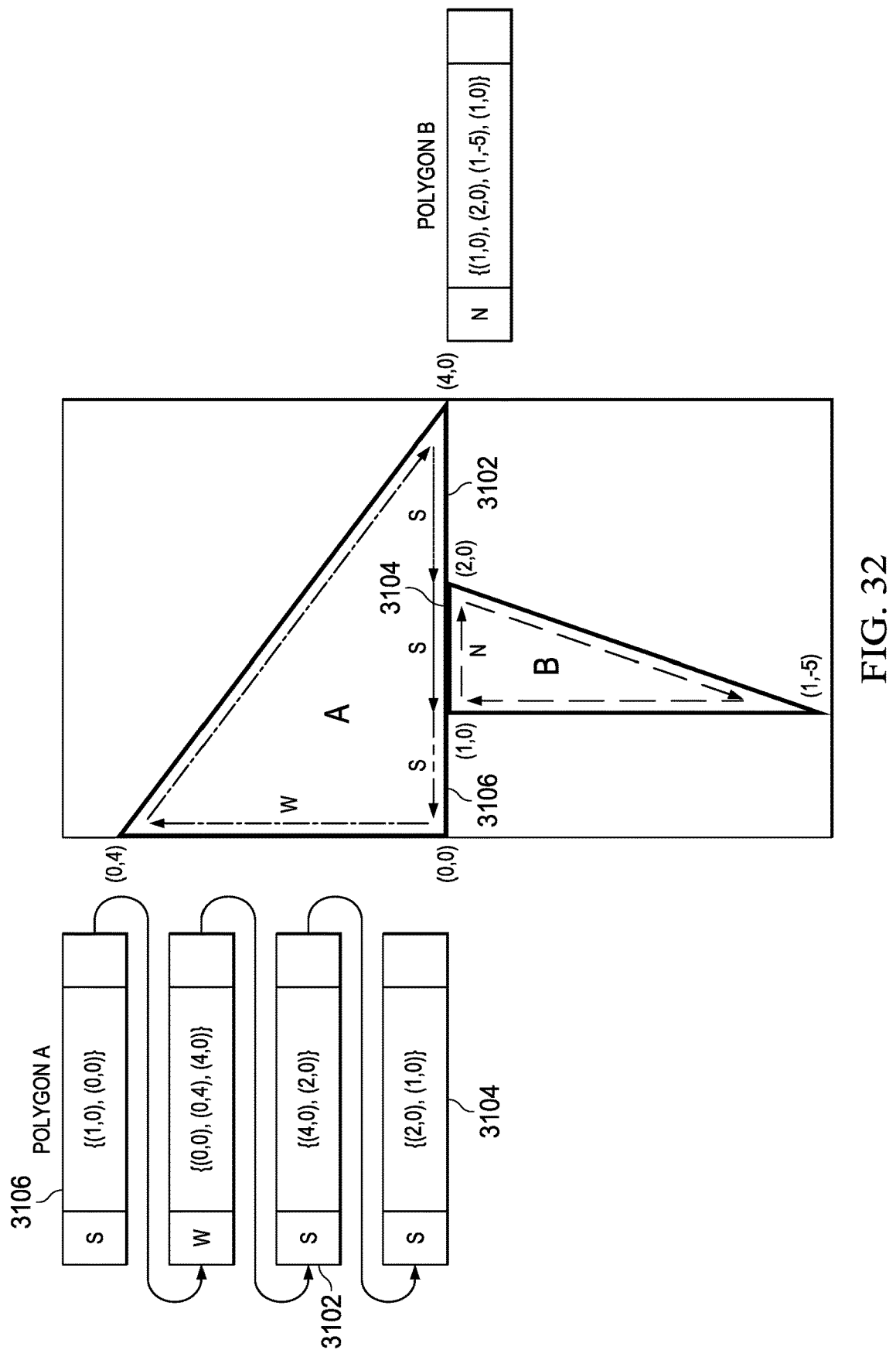

FIGS. 30-32 are a simple example illustrating edge splitting in which an edge of one polygon of a pair of polygons with matching overlapping invalid edges needs to be split twice to achieve an edge that exactly matches the overlapping invalid edge of the other polygon. In FIG. 30, the south edge of polygon A completely overlaps the matching north edge of polygon B on both sides, necessitating the split of the south edge of polygon A into three south edges to achieve a south edge that exactly matches the north edge of polygon B.

As illustrated in FIG. 31, the existing south edge of polygon A is initially split by shortening the existing edge such that the shortened south edge 3100 overlaps the initial two point coordinates of the north edge of polygon B and an additional south edge 3102 is added to the edge linked list for polygon A to cover the remaining portion of the previously longer edge. In this example, the additional south edge 3102 is added to the end of the edge linked list. In some embodiments, the additional south edge is added to the beginning of the edge linked list.

As illustrated in FIG. 32, the shortened south edge is then split again to create a south edge 3106 that exactly matches the north edge of polygon B. Another south edge 3104 is added to the edge linked list for polygon A to cover the remaining portion of the edge. One of ordinary skill in the art will understand that the two splits may be performed in different ways than this example.

Figure 33:
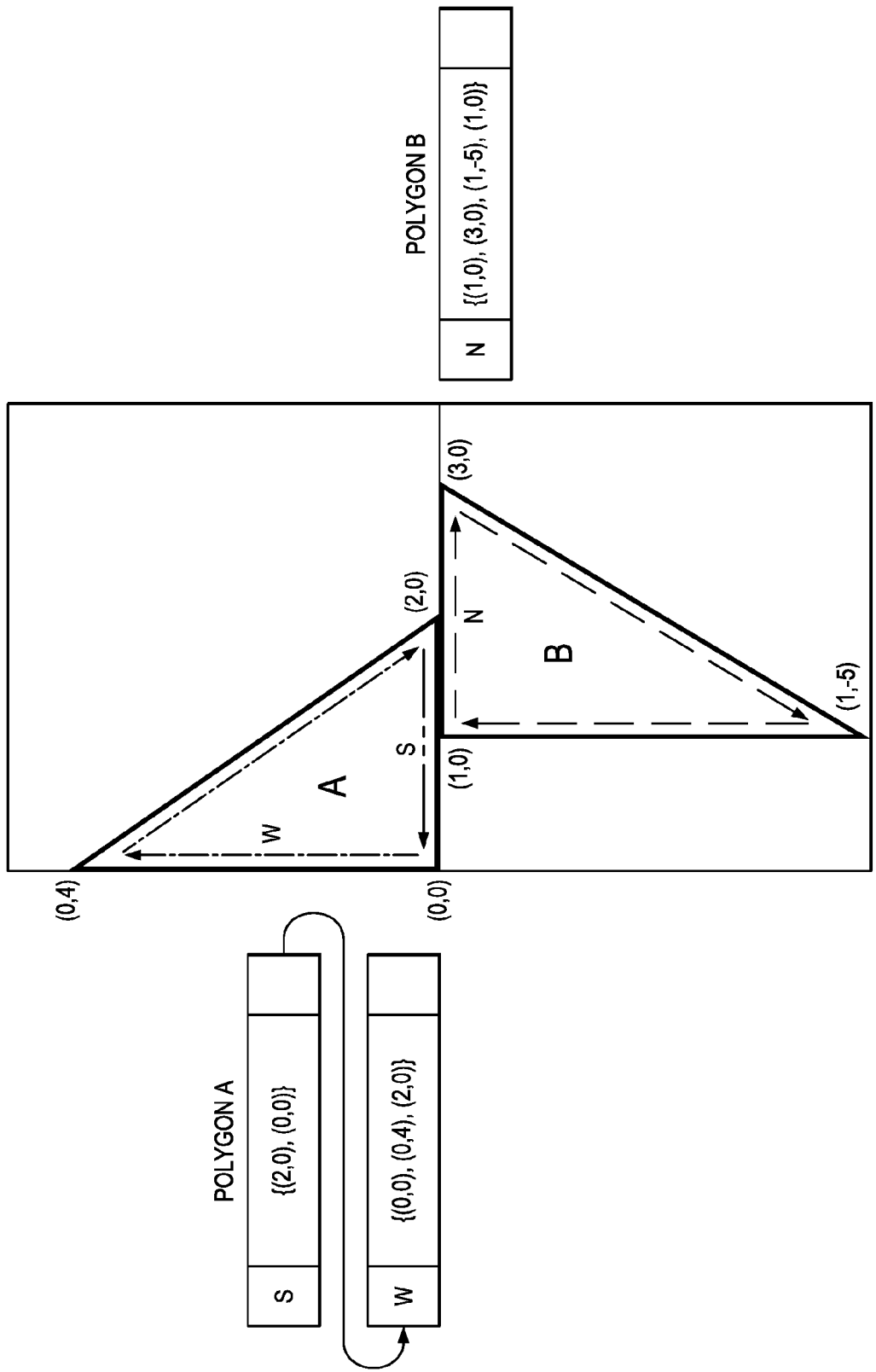
Figure 34:
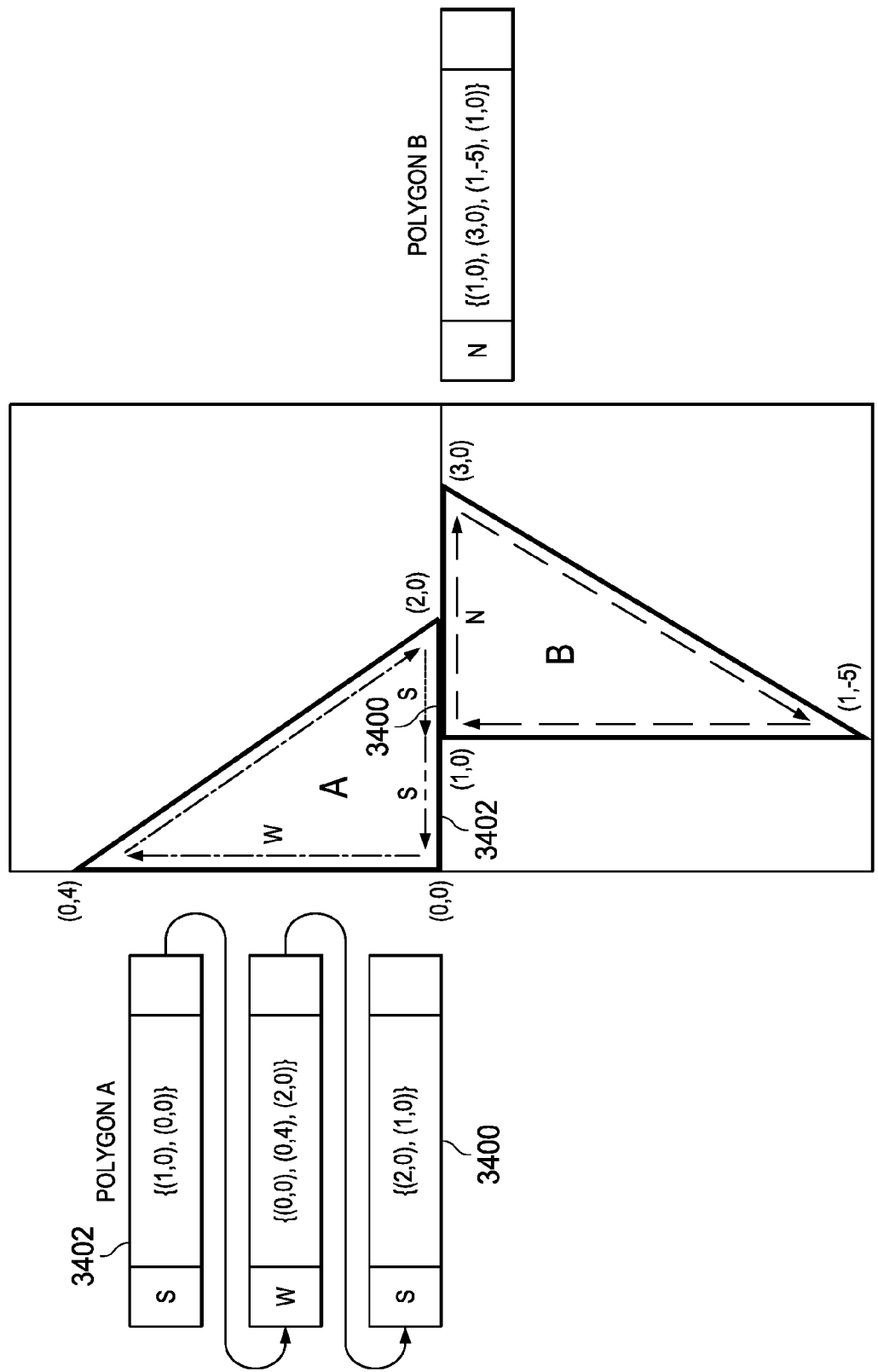
Figure 35:
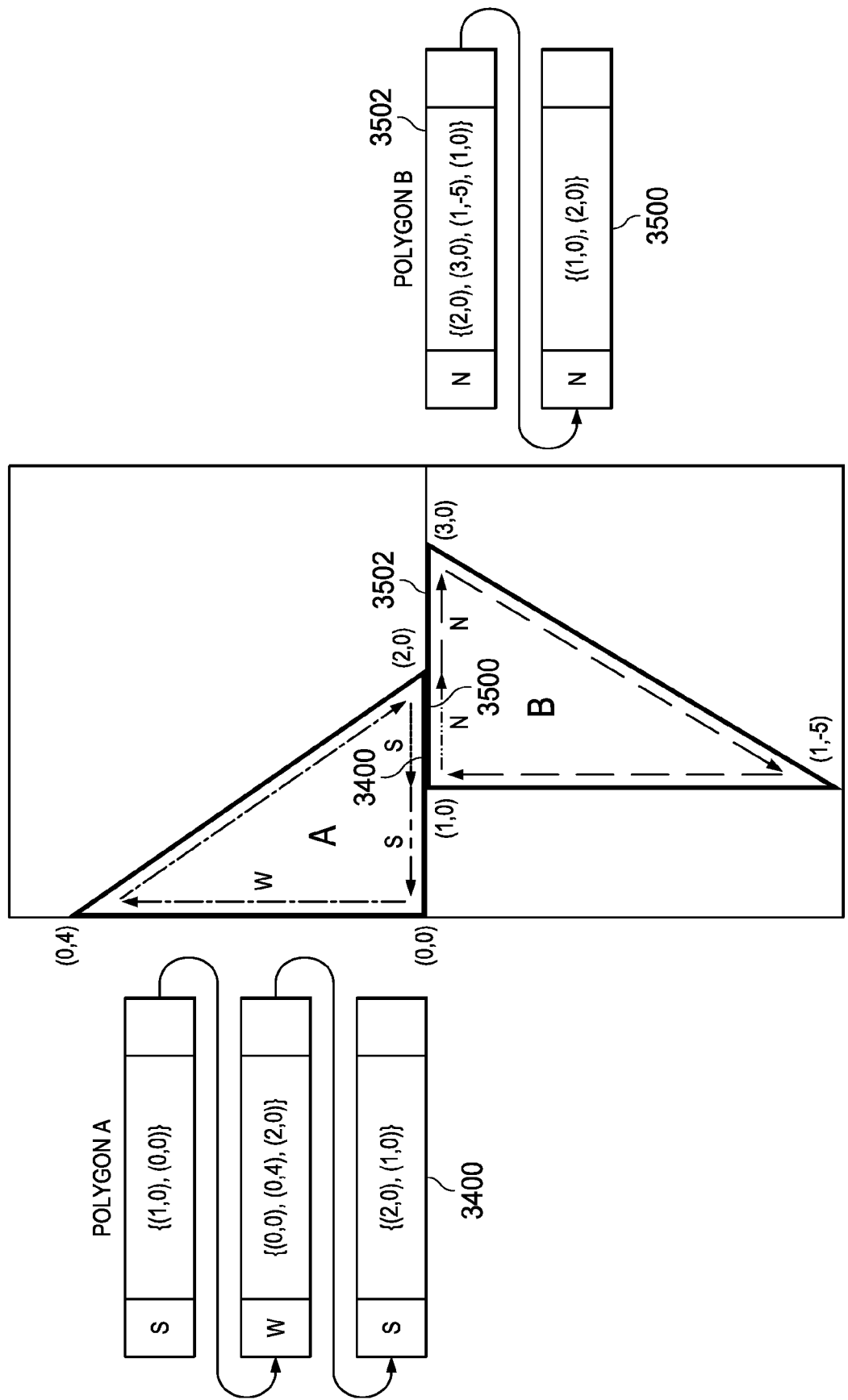

FIGS. 33-35 are a simple example illustrating edge splitting in which both edges of a pair of polygons with matching overlapping invalid edges need to be split one time to achieve exactly matching overlapping invalid edges. In FIG. 33, there is a partial overlap between the south edge of polygon A and the north edge of polygon B such that both edges include non-matching portions, necessitating that both edges be split to achieve exactly matching south and north edges.

As illustrated in FIG. 34, the existing south edge of polygon A is split by creating a new south edge 3400 that ends where the north edge of polygon B begins and the existing south edge 3402 is shortened to cover the remaining portion of the previously longer edge. In this example, the new south edge 3400 is added to the end of the edge linked list. In some embodiments, the new south edge is added to the beginning of the edge linked list.

As illustrated in FIG. 35, the existing north edge of polygon B is split by creating a new north edge 3500 that exactly matches the new south edge 3400 of polygon A and the existing north edge is shortened to cover the remaining portion of the edge. In this example, the new north edge 3500 is added to the end of the edge linked list. In some embodiments, the new north edge is added to the beginning of the edge linked list. Further, in some embodiments, the splitting of the two edges is performed in the reverse order.

Figure 37:
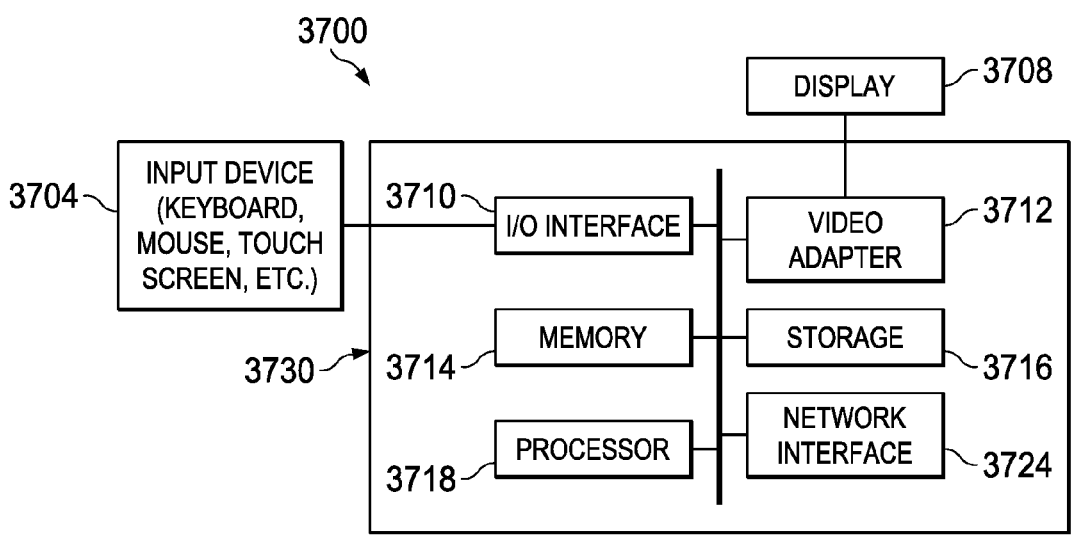
FIGS. 36 and 37 are diagrams of two example digital devices configured to perform polygon merging.
Figure 36:
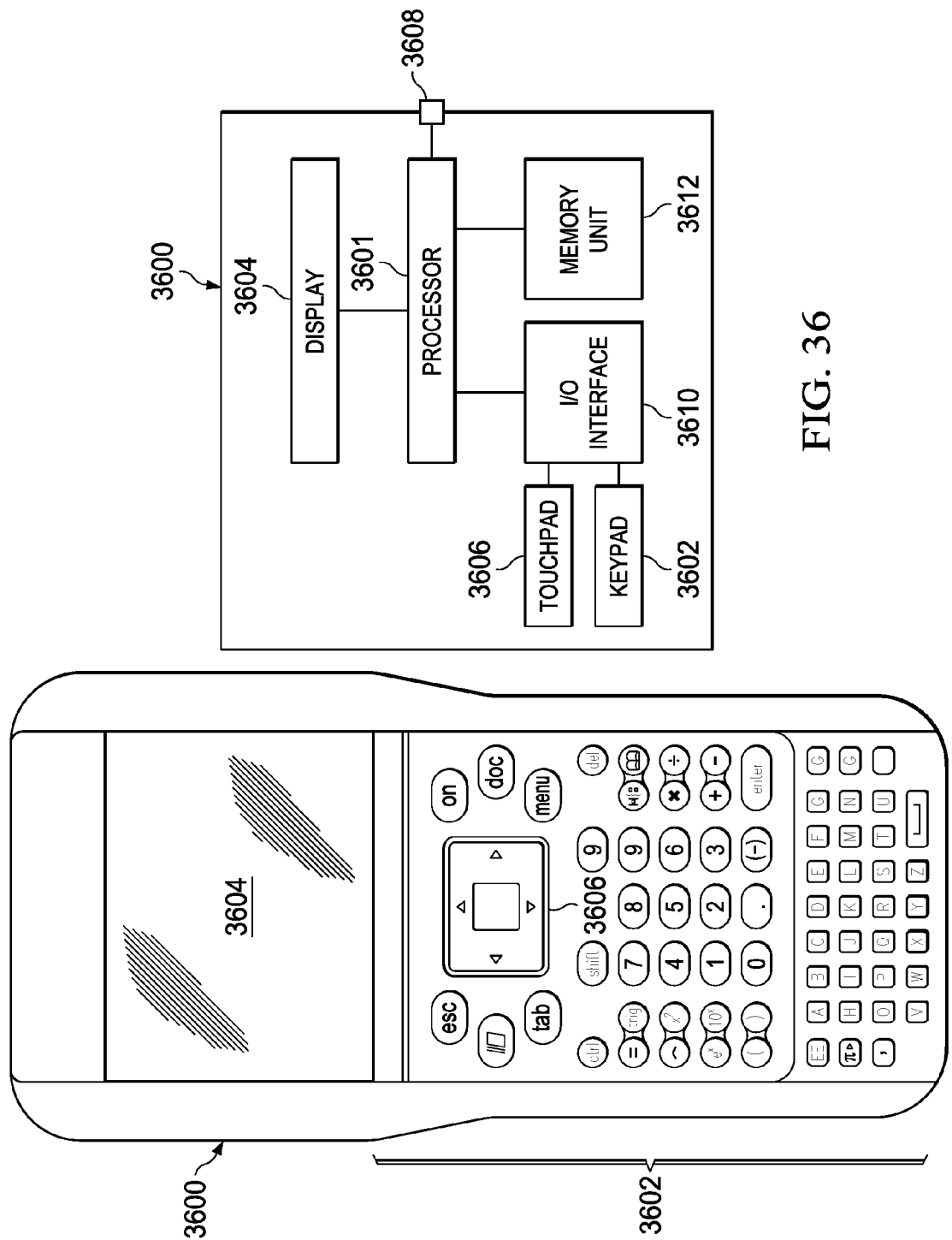

Embodiments of the polygon merging described herein may be implemented on any suitably configured digital device, e.g., a handheld graphing calculator, a smart phone, a tablet, a laptop, or a computer system. FIGS. 36 and 37 are diagrams of two example digital devices.

FIG. 36 is an example of a handheld graphing calculator 3600 configured to perform an embodiment of the polygon merging described herein. The handheld calculator 3600 includes a graphical display 3604, and a keypad 3602 that includes a touchpad 3606. The graphical display 3604 may be used to display, among other things, information input to applications executing on the handheld graphing calculator 3600 and various outputs of the applications. For example, the graphical display 3604 may be used to display plots of implicit inequalities generated using an embodiment of the polygon merging. The graphical display 3604 may be, for example, an LCD display.

The keypad 3602 allows a user to enter data and functions and to start and interact with applications executing on the handheld graphing calculator 3600. The keypad 3602 also includes an alphabetic keyboard for entering text. The touchpad 3606 allows a user to interact with the display 3604 by translating the motion and position of the user's fingers on the touchpad 3606 to provide functionality similar to using an external pointing device, e.g., a mouse. A user may use the touchpad 3606 to perform operations similar to using a pointing device on a computer system, e.g., scrolling the display 3604 content, pointer positioning, selecting, highlighting, etc.

The handheld graphing calculator 3600 includes a processor 3601 coupled to a memory unit 3612, e.g., a computer readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 3608 provides connectivity to external devices, e.g., a wireless adaptor or wireless cradle. In one or more embodiments, the input/output port 3608 is a bi-directional connection such as a mini-A USB port. Also included in the handheld graphing calculator 3600 is an I/O interface 3610. The I/O interface 3610 provides an interface to couple input devices such as the touchpad 3606 and the keypad 3602 to the processor 3601. In some embodiments, the handheld calculator 3600 may also include an integrated wireless interface (not shown) or a port for connecting an external wireless interface (not shown). In one or more embodiments, the memory unit 3612 stores software instructions to be executed by the processor 3601 to perform an embodiment of polygon merging as described herein.

FIG. 37 is an example of a computer system 3700 configured to perform an embodiment of the polygon merging described herein. The computer system 3700 includes a processing unit 3730 coupled to one or more input devices 3704 (e.g., a mouse, a keyboard, or the like), and one or more output devices, such as a display 3708. In some embodiments, the display 3708 may be touch screen, thus allowing the display 3708 to also function as an input device. The processing unit 3730 may be, for example, a desktop computer, a workstation, a laptop computer, a dedicated unit customized for a particular application, or the like. The display 3708 may be any suitable visual display unit such as, for example, a computer monitor, an LED, LCD, or plasma display, a television, a high definition television, or a combination thereof. The display 3708 may be used to display plots of implicit inequalities generated using an embodiment of the polygon merging.

The processing unit 3730 includes a processor 3718, memory 3714, a mass storage device 3716, a video adapter 3712, and an I/O interface 3710 connected by a bus. The bus may be one or more of any type of several bus architectures including a memory bus or memory controller, a peripheral bus, video bus, or the like. The processor 3718 may be any type of electronic data processor. For example, the processor 3718 may be a processor from Intel Corp., a processor from Advanced Micro Devices, Inc., a Reduced Instruction Set Computer (RISC), an Application-Specific Integrated Circuit (ASIC), or the like. The memory 3714, e.g., a computer readable medium, may be any type of system memory such as static random access memory (SRAM), dynamic random access memory (DRAM), synchronous DRAM (SDRAM), read-only memory (ROM), a combination thereof, or the like. Further, the memory 3714 may include ROM for use at boot-up, and DRAM for data storage for use while executing programs.

The mass storage device 3716, e.g., a computer readable medium, may include any type of storage device configured to store data, programs, and other information and to make the data, programs, and other information accessible via the bus. In one or more embodiments, the mass storage device 3716 stores software instructions to be executed by the processor 3718 to perform an embodiment of polygon merging as described herein. The mass storage device 3716 may be, for example, one or more of a hard disk drive, a magnetic disk drive, an optical disk drive, or the like.

The video adapter 3712 and the I/O interface 3710 provide interfaces to couple external input and output devices to the processing unit 3730. The processing unit 3730 also includes a network interface 3724. The network interface 3724 allows the processing unit 3730 to communicate with remote units via a network (not shown). The network interface 3724 may provide an interface for a wired link, such as an Ethernet cable or the like, or a wireless link. The computer system 3700 may also include other components not specifically shown. For example, the computer system 3700 may include power supplies, cables, a motherboard, removable storage media, cases, and the like.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming a clockwise ordering of edges in the edge linked list of edges and a clockwise ordering of the points in an edge. One of ordinary skill in the art will understand embodiments in which a counterclockwise ordering is used.

In another example, embodiments have been described herein in which edges of a north polygon are added to a south polygon as the polygons are merged. One of ordinary skill in the art will understand embodiments in which the edges of the south polygon are added to the north polygon. Further, one of ordinary skill in the art will understand embodiments in which edges of a west polygon are added to an east polygon or vice versa.

In another example, embodiments have been described herein in which the coordinates of all points of a polygon are included in the edge linked list of the polygon. One of ordinary skill in the art will understand embodiments in which some edges in an edge linked list do not include the last point in the edge because the last point in the edge is the same as the first point in the next edge of the edge linked list. In such embodiments, the test for overlapping edges may need to consider the next edge in the edge linked list as an edge may only have one point and the merging of all points except the first two is changed to the merging of all points except the first one.

In another example, embodiments have been described herein in which the initial edge is deleted from the edge linked lists of both polygon A and polygon B. One of ordinary skill in the art will understand embodiments in which the initial edge is not deleted from the edge linked list of polygon A.

Software instructions implementing all or portions of methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if one device couples to another device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the invention.

What is claimed is:

1. A method for merging polygons in adjacent tiles, the method comprising:
   determining that a first polygon in a tile having a first edge linked list and a second polygon in an adjacent tile having a second edge linked list have overlapping invalid edges, wherein an edge comprises an ordered set of point coordinates in which an initial two point coordinates lie on a tile boundary and last point coordinates of the set also lie on a tile boundary, and an edge linked list is an ordered list of edges of a polygon; and
   merging the first edge linked list and the second edge linked list to generate a third edge linked list for a merged polygon comprising the first polygon and the second polygon.

2. The method of claim 1, further comprising combining edges in the third edge linked list that are on a same tile boundary.

3. The method of claim 1, wherein an order of the edges in an edge linked list and an order of the point coordinates in a set of point coordinates of an edge is one selected from clockwise and counterclockwise.

4. The method of claim 1, wherein, when the first polygon and the second polygon comprise at least two edges, merging the first edge linked list comprises:
   rotating the first edge linked list and the second edge linked list, wherein the overlapping invalid edges of the first and second polygons become initial edges in each edge linked list;
   copying all point coordinates of the initial edge of the first edge linked list except the initial two point coordinates to a last edge of the second edge linked list;
   copying all point coordinates of the initial edge of the second edge linked list except the initial two point coordinates to a last edge of the first edge linked list;
   deleting the initial edge of the second edge linked list; and
   adding all edges of the first edge linked list except the initial edge of the first edge linked list to the second edge linked list to generate the third edge linked list.

5. The method of claim 4, further comprising splitting one of the overlapping edges into at least two edges to generate an edge that exactly matches a portion of the other overlapping edge.

6. The method of claim 1, wherein, when the first polygon has single edge and the second polygon has at least two edges, merging the first edge linked list comprises:
   rotating the second edge linked list, wherein the overlapping invalid edge of the second polygon becomes an initial edge in the second edge linked list;
   copying all point coordinates except the initial two point coordinates of the initial edge of the first edge linked list to a last edge of the second edge linked list;
   copying all point coordinates except the initial two point coordinates of the initial edge of the second edge linked list to a last edge of the second edge linked list; and
   deleting the initial edge of the second edge linked list to generate the third edge linked list.

7. The method of claim 1, wherein, when the first polygon and the second polygon each have a single edge, merging the first edge linked list comprises:
   deleting the initial two point coordinates in a set of points of the first edge linked list and the second edge linked list; and
   adding the set of points of the first edge linked list to an end of the set of points of the second edge linked list to generate the third edge linked list.

8. A digital device comprising:
   a memory storing software instructions for merging polygons in adjacent tiles, wherein the software instructions comprise software instructions to determine that a first polygon in a tile having a first edge linked list and a second polygon in an adjacent tile having a second edge linked list have overlapping invalid edges, wherein an edge comprises an ordered set of point coordinates in which an initial two point coordinates lie on a tile boundary and last point coordinates of the set also lie on a tile boundary, and an edge linked list is an ordered list of edges of a polygon; and
   merge the first edge linked list and the second edge linked list to generate a third edge linked list for a merged polygon comprising the first polygon and the second polygon; and
   a processor coupled to the memory to execute the software instructions.

9. The digital device of claim 8, wherein the software instructions further comprise software instructions to combine edges in the third edge linked list that are on a same tile boundary.

10. The digital device of claim 8, wherein an order of the edges in an edge linked list and an order of the point coordinates in a set of point coordinates of an edge is one selected from clockwise and counterclockwise.

11. The digital device of claim 8, wherein the software instructions to merge the first edge linked list further comprise software instructions to:

rotate the first edge linked list and the second edge linked list when the first polygon and the second polygon comprise at least two edges, wherein the overlapping invalid edges of the first and second polygons become initial edges in each edge linked list;

copy all point coordinates of the initial edge of the first edge linked list except the initial two point coordinates to a last edge of the second edge linked list;

copy all point coordinates of the initial edge of the second edge linked list except the initial two point coordinates to a last edge of the first edge linked list;

delete the initial edge of the second edge linked list; and add all edges of the first edge linked list except the initial edge of the first edge linked list to the second edge linked list to generate the third edge linked list.

12. The digital device of claim 11, wherein the software instructions to merge the first edge linked list further comprise software instructions to split one of the overlapping edges into at least two edges to generate an edge that exactly matches a portion of the other overlapping edge.

13. The digital device of claim 8, wherein the software instructions to merge the first edge linked list further comprise software instructions to:

rotate the second edge linked list when the first polygon has single edge and the second polygon has at least two edges, wherein the overlapping invalid edge of the second polygon becomes an initial edge in the second edge linked list;

copy all point coordinates except the initial two point coordinates of the initial edge of the first edge linked list to a last edge of the second edge linked list;

copy all point coordinates except the initial two point coordinates of the initial edge of the second edge linked list to a last edge of the second edge linked list; and delete the initial edge of the second edge linked list to generate the third edge linked list.

14. The digital device of claim 8, wherein the software instructions to merge the first edge linked list further comprise software instructions to:

delete the initial two point coordinates in a set points of the first edge linked list and the second edge linked list when the first polygon and the second polygon each have a single edge; and add the set of points of the first edge linked list to an end of the set of points of the second edge linked list to generate the third edge linked list.

15. The digital device of claim 8, wherein the digital device is a graphing calculator.

16. A non-transitory computer-readable medium storing software instructions that, when executed by a processor, cause a method for merging polygons in adjacent tiles to be executed, the method comprising:

determining that a first polygon in a tile having a first edge linked list and a second polygon in an adjacent tile having a second edge linked list have overlapping invalid edges, wherein an edge comprises an ordered set of point coordinates in which an initial two point coordinates lie on a tile boundary and last point coordinates of the set also lie on a tile boundary, and an edge linked list is an ordered list of edges of a polygon; and merging the first edge linked list and the second edge linked list to generate a third edge linked list for a merged polygon comprising the first polygon and the second polygon.

17. The non-transitory computer-readable medium of claim 16, wherein the method further comprises combining edges in the third edge linked list that are on a same the boundary.

18. The non-transitory computer-readable medium of claim 16, wherein an order of the edges in an edge linked list and an order of the point coordinates in a set of point coordinates of an edge is one selected from clockwise and counterclockwise.

19. The non-transitory computer-readable medium of claim 16, wherein, when the first polygon and the second polygon comprise at least two edges, merging the first edge linked list comprises:

rotating the first edge linked list and the second edge linked list, wherein the overlapping invalid edges of the first and second polygons become initial edges in each edge linked list;

copying all point coordinates of the initial edge of the first edge linked list except the initial two point coordinates to a last edge of the second edge linked list;

copying all point coordinates of the initial edge of the second edge linked list except the initial two point coordinates to a last edge of the first edge linked list;

deleting the initial edge of the second edge linked list; and adding all edges of the first edge linked list except the initial edge of the first edge linked list to the second edge linked list to generate the third edge linked list.

20. The non-transitory computer-readable medium of claim 19, wherein the method further comprises splitting one of the overlapping edges into at least two edges to generate an edge that exactly matches a portion of the other overlapping edge.

21. The non-transitory computer-readable medium of claim 16, wherein, when the first polygon has single edge and the second polygon has at least two edges, merging the first edge linked list comprises:

rotating the second edge linked list, wherein the overlapping invalid edge of the second polygon becomes an initial edge in the second edge linked list;

copying all point coordinates except the initial two point coordinates of the initial edge of the first edge linked list to a last edge of the second edge linked list;

copying all point coordinates except the initial two point coordinates of the initial edge of the second edge linked list to a last edge of the second edge linked list; and deleting the initial edge of the second edge linked list to generate the third edge linked list.

22. The non-transitory computer-readable medium of claim 16, wherein, when the first polygon and the second polygon each have a single edge, merging the first edge linked list comprises:

deleting the initial two point coordinates in a set of points of the first edge linked list and the second edge linked list; and adding the set of points of the first edge linked list to an end of the set of points of the second edge linked list to generate the third edge linked list.

* * * * *